(12) United States Patent  
Foland et al.

(10) Patent No.: US 11,804,138 B2  
(45) Date of Patent: Oct. 31, 2023

(54) SYSTEMS AND METHODS FOR AUTOMATED FLEET MANAGEMENT FOR AERIAL VEHICLES

(71) Applicant: BETA AIR, LLC, South Burlington, VT (US)

(72) Inventors: Steven J. Foland, South Burlington, VT (US); Lochie Ferrier, South Burlington, VT (US); Nick Warren, South Burlington, VT (US); John Palombini, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/528,597

(22) Filed: Nov. 17, 2021

(65) Prior Publication Data

US 2023/0154337 A1    May 18, 2023

(51) Int. Cl.
*G08G 5/00* (2006.01)
*B64C 29/00* (2006.01)

(52) U.S. Cl.
CPC .......... *G08G 5/0008* (2013.01); *B64C 29/00* (2013.01); *G08G 5/0039* (2013.01)

(58) Field of Classification Search
CPC ..... G08G 5/0008; G08G 5/0039; B64C 29/00
See application file for complete search history.

(56) References Cited

U.S. PATENT DOCUMENTS

| | | | |
|---|---|---|---|
| 9,651,382 B1 * | 5/2017 | Piponi | H04B 7/18504 |
| 9,678,507 B1 * | 6/2017 | Douglas | G08G 5/0013 |
| 9,809,306 B2 * | 11/2017 | Stark | G05D 1/104 |
| 9,851,716 B2 | 12/2017 | Kugelmass | |
| 9,870,005 B2 * | 1/2018 | Frolov | B64C 13/16 |
| 9,927,807 B1 | 3/2018 | Ganjoo | |
| 9,997,080 B1 | 6/2018 | Chambers et al. | |
| 10,560,181 B2 | 2/2020 | Russell et al. | |
| 10,586,464 B2 * | 3/2020 | Dupray | G08G 5/0013 |

(Continued)

FOREIGN PATENT DOCUMENTS

| | | | | |
|---|---|---|---|---|
| WO | WO-03029922 A2 * | 4/2003 | | B64C 13/20 |
| WO | WO-2016123303 A1 * | 8/2016 | | G07C 5/008 |

(Continued)

*Primary Examiner* — Donald J Wallace
*Assistant Examiner* — Jalal C Coduroglu
(74) *Attorney, Agent, or Firm* — CALDWELL INTELLECTUAL PROPERTY LAW

(57) ABSTRACT

In an aspect of the present disclosure is a system of automated fleet management for aerial vehicles, including a first aerial vehicle, the aerial vehicle comprising: a first sensor configured to measure an external metric and generate external datum based on the external metric; and a second sensor configured to measure an aircraft metric and generate aircraft datum based on the aircraft metric; and a computing device operating on the first aerial vehicle, the computing device communicatively connected to a network including at least a second aerial vehicle, the computing device configured to: receive the external datum from the first sensor of the first aerial vehicle and the aircraft datum from the second sensor of the first aerial vehicle; and transmit at least a flight plan update element to the network based on the external datum and the aircraft datum.

20 Claims, 11 Drawing Sheets

(56) References Cited

U.S. PATENT DOCUMENTS

| | | | |
|---|---|---|---|
| 10,795,352 B2 | 10/2020 | Augugliaro et al. | |
| 10,848,939 B1* | 11/2020 | Panergo | H04W 4/024 |
| 10,860,115 B1* | 12/2020 | Tran | G08G 5/0013 |
| 11,074,819 B2 | 7/2021 | Subramaniyan et al. | |
| 11,094,202 B2 | 8/2021 | Gong et al. | |
| 2005/0187677 A1* | 8/2005 | Walker | B64C 13/20 |
| | | | 701/16 |
| 2012/0143405 A1* | 6/2012 | Cabos | G07C 5/008 |
| | | | 701/3 |
| 2012/0191333 A1* | 7/2012 | Sawhill | G08G 5/0052 |
| | | | 701/122 |
| 2014/0081483 A1* | 3/2014 | Weinmann | G08G 1/20 |
| | | | 701/14 |
| 2015/0279218 A1* | 10/2015 | Irrgang | G07C 5/0816 |
| | | | 701/3 |
| 2016/0039436 A1* | 2/2016 | Bhagwatkar | B61L 23/00 |
| | | | 348/148 |
| 2016/0219061 A1* | 7/2016 | Walton | H04W 4/80 |
| 2016/0275801 A1* | 9/2016 | Kopardekar | G08G 5/0082 |
| 2016/0364989 A1* | 12/2016 | Speasl | B64F 1/222 |
| 2017/0293307 A1* | 10/2017 | Frolov | B64D 43/02 |
| 2018/0040250 A1* | 2/2018 | Sawhill | G08G 5/045 |
| 2018/0231972 A1* | 8/2018 | Woon | G05D 1/0808 |
| 2018/0362190 A1* | 12/2018 | Chambers | B64C 39/024 |
| 2019/0033862 A1* | 1/2019 | Groden | G08G 5/0086 |
| 2019/0047698 A1 | 2/2019 | Jassowski et al. | |
| 2019/0054937 A1* | 2/2019 | Graetz | G08G 5/0013 |
| 2019/0287062 A1* | 9/2019 | Skaaksrud | G05D 1/0287 |
| 2020/0262313 A1* | 8/2020 | Muniz | B60L 53/64 |
| 2020/0364456 A1* | 11/2020 | Tran | A01G 25/09 |
| 2021/0089055 A1* | 3/2021 | Tran | B64C 27/20 |
| 2021/0092604 A1* | 3/2021 | Fox | H04L 9/3268 |
| 2021/0094688 A1* | 4/2021 | Sorek | G05D 1/104 |
| 2021/0141373 A1* | 5/2021 | Bash | G08G 5/0069 |
| 2021/0221506 A1 | 7/2021 | Phelan et al. | |
| 2021/0327288 A1* | 10/2021 | Subramaniyan | G08G 5/0034 |
| 2021/0366292 A1* | 11/2021 | Braaten | G08G 5/0013 |
| 2021/0407303 A1* | 12/2021 | Yogesha | G08G 5/006 |
| 2022/0057473 A1* | 2/2022 | Amarnathan | G01S 19/252 |
| 2022/0198921 A1* | 6/2022 | Kangasrääsiö | G08G 1/0116 |
| 2022/0208011 A1* | 6/2022 | Holmes | G08G 5/0039 |

FOREIGN PATENT DOCUMENTS

| | | | |
|---|---|---|---|
| WO | 2020053785 A1 | 3/2020 | |
| WO | WO-2020053785 A1 * | 3/2020 | B64D 15/22 |

* cited by examiner

SYSTEMS AND METHODS FOR AUTOMATED FLEET MANAGEMENT FOR AERIAL VEHICLES

FIELD OF THE INVENTION

The present invention generally relates to the field of management of aerial vehicles. In particular, the present invention is directed to systems and methods for automated fleet management for aerial vehicles.

BACKGROUND

Management of aerial vehicles may expand useful applications for aerial vehicles by reducing oversight needed. Management of aerial vehicles may not be automated and/or reliable.

SUMMARY OF THE DISCLOSURE

In an aspect of the present disclosure is a system of automated fleet management for aerial vehicles, including a first aerial vehicle, the aerial vehicle comprising: a first sensor configured to measure an external metric and generate external datum based on the external metric; and a second sensor configured to measure an aircraft metric and generate aircraft datum based on the aircraft metric; and a computing device operating on the first aerial vehicle, the computing device communicatively connected to a network including at least a second aerial vehicle, the computing device configured to: receive the external datum from the first sensor of the first aerial vehicle and the aircraft datum from the second sensor of the first aerial vehicle; and transmit at least a flight plan update element to the network based on the external datum and the aircraft datum.

In another aspect of the present disclosure is a method for implementing a system of automated fleet management for aerial vehicles, including receiving, at a computing device operating on a first aerial vehicle and communicatively connected to a network including at least a second aerial vehicle, an external datum based on an external metric from a first sensor and an aircraft datum based on an aircraft metric from a second sensor; and transmitting, by the computing device, at least a flight plan update element based on the external datum and the aircraft datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated fleet management for aerial vehicles. In an embodiment, aspects of the present disclosure are systems and methods for aerial vehicles to communicate directly to each other and update flight plans according to data generated by sensors.

Aspects of the present disclosure can be used to operate a fleet of aerial vehicles autonomously. Aspects of the present disclosure can also be used to have a fleet of aerial vehicles automatically update a flight plan for the fleet to accommodate detected wind. This is so, at least in part, because a first aerial vehicle of a fleet can transmit data regarding detected wind to other aerial vehicles of the fleet. Exemplary embodiments illustrating aspects of the present disclosure are described below in the context of several specific examples.

Figure 1:
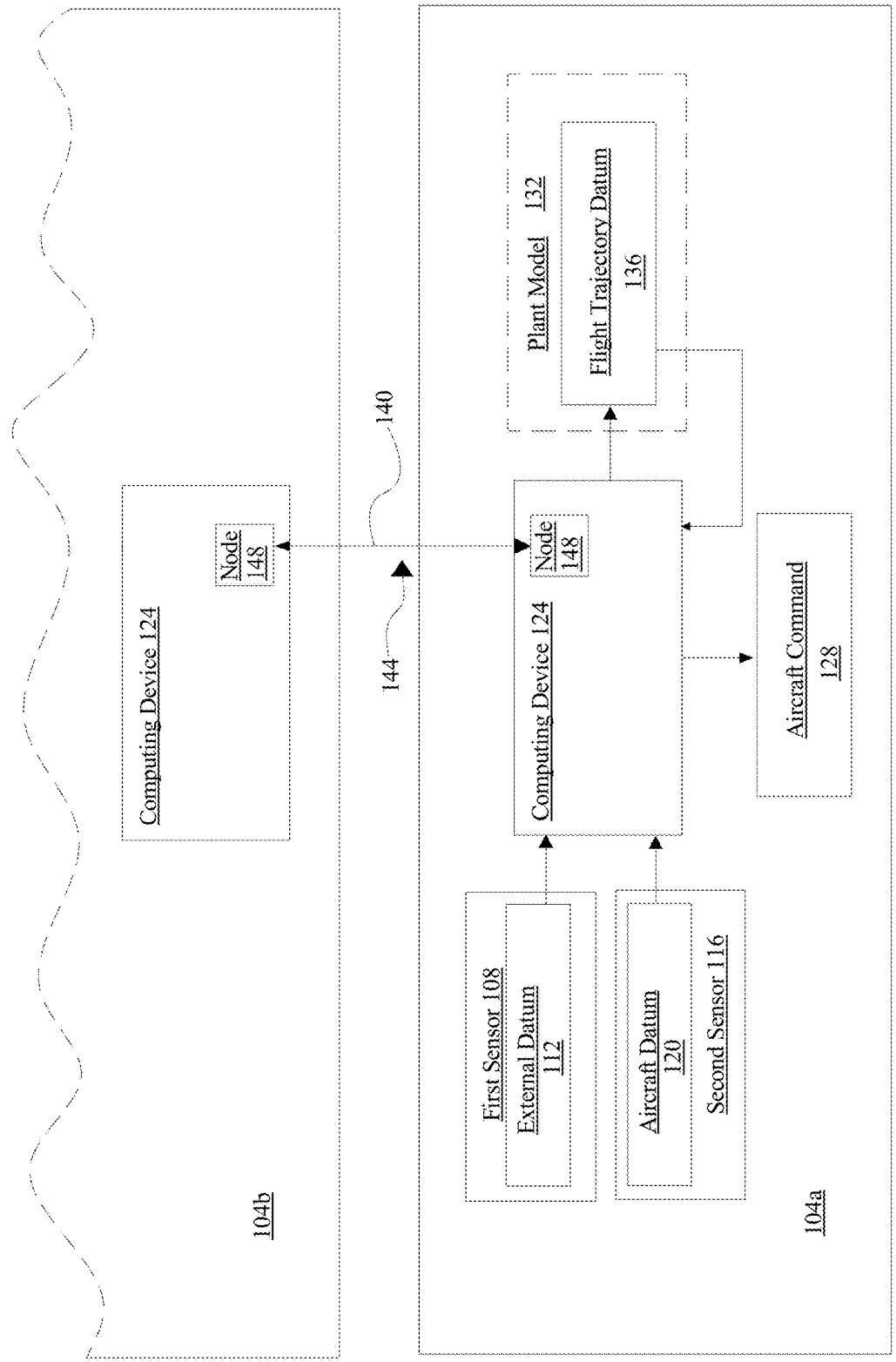
FIG. 1 is a block diagram of an exemplary system for automated fleet management for aerial vehicles according to an embodiment of the present disclosure.

Referring now to FIG. 1, an exemplary embodiment of a system 100 of an automated fleet management for aerial vehicles 104 is illustrated. System 100 includes a first aerial vehicle 104a. Aerial vehicles 104 may be electric aircraft each powered by one or more electric motor. Aerial vehicles 104 may include electrical vertical takeoff and landing (eVTOL) aircraft, helicopter, unmanned aerial vehicles (UAVs), drones, rotorcraft, commercial aircraft, and/or the like. Aerial vehicle may include one or more components that generate lift, including without limitation wings, airfoils, rotors, propellers, jet engines, or the like, or any other component or feature that an aircraft may use for mobility during flight.

Still referring to FIG. 1, first aerial vehicle 104a includes a first sensor 108. Aerial vehicles 104 may each include first sensor 108. As used in this disclosure, a "sensor" is a device that is configured to detect an input and/or a phenomenon and transmit information related to the detection. First sensor 108 may be attached to each of aerial vehicles 104. First sensor 108 may attached to or remote from a component of aerial vehicles 104 it may be configured to measure.

First sensor 108 may be communicatively connected to a communicatively connected to a component of aerial vehicles 104 it may be configured to measure. "Communicatively connected", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicatively connecting includes electrically coupling an output of one device, component, or circuit to an input of another device, component, or circuit. Communicatively connecting may be performed via a bus or other facility for intercommunication between elements of a computing device. Communicatively connecting may include indirect connections via "wireless" connection, low power wide area network, radio communication, optical communication, magnetic, capacitive, or optical coupling, or the like.

With continued reference to FIG. 1, in one or more embodiments, independent sensors may include separate sensors measuring physical or electrical quantities that may be powered by and/or in communication with circuits independently, where each may signal sensor output to a control circuit such as control circuit. First sensor 108 may transmit/receive signals to/from a computing device. Signals may include electrical, electromagnetic, visual, audio, radio waves, or another undisclosed signal type alone or in combination. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

In one or more embodiments, first sensor 108 may include a sense board. A sense board may have at least a portion of a circuit board that includes one or more sensors configured to, for example, measure a temperature of a power source of aerial vehicles 104. In one or more embodiments, a sense board may be connected to one or more battery modules or cells of a power source. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

With continued reference to FIG. 1, first sensor 108 is configured to measure an external metric. As used in this disclosure, "external metric" is a phenomenon associated with an area external to aerial vehicles such as weather conditions around or near the aerial vehicles. External metric may include measurements of one or more of temperature; wind velocity; precipitation; fluid pressure; humidity; and visibility. First sensor 108 may include one or more sensors to detect external metric and generate external datum 112 based on the external metric. As used in this disclosure, "external datum" is one or more elements of data representing external metric. First sensor 108 may include temperature sensors, humidity sensors, accelerometers, electrochemical sensors, gyroscopes, magnetometers, inertial measurement unit (IMU), pressure sensor, proximity sensor, displacement sensors, light sensors, pitot tubes, wind sensors, motion sensors.

Still referring to FIG. 1, first sensor 108 may include weather sensors. In one or more embodiments, first sensor 108 may include a wind sensor. In some embodiments, wind sensor may be configured to measure a wind datum. A "wind datum" may include data of wind forces acting on an aerial vehicle. Wind datum may include wind strength, direction, shifts, duration, or the like. For example, and without limitations, first sensor 108 may include an anemometer. An anemometer may be configured to detect a wind speed. In one or more embodiments, the anemometer may include a hot wire, laser doppler, ultrasonic, and/or pressure anemometer. In some embodiments, first sensor 108 may include a pressure sensor. "Pressure", for the purposes of this disclosure and as would be appreciated by someone of ordinary skill in the art, is a measure of force required to stop a fluid from expanding and is usually stated in terms of force per unit area. The pressure sensor that may be included in first sensor 108 may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. In one or more embodiments, a pressor sensor may include a barometer. In some embodiments, a pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

With continued reference to FIG. 1, in one or more embodiments, first sensor 108 may include an altimeter that may be configured to detect an altitude of aerial vehicle 104. In one or more embodiments, first sensor 108 may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. In one or more embodiments, first sensor 108 may include an altimeter. The altimeter may be configured to measure an altitude. In some embodiments, the altimeter may include a pressure altimeter. In other embodiments, the altimeter may include a sonic, radar, and/or Global Positioning System (GPS) altimeter. In some embodiments, first sensor 108 may include a meteorological radar that monitors weather conditions. In some embodiments, first sensor 108 may include a ceilometer. The ceilometer may be configured to detect and measure a cloud ceiling and cloud base of an atmosphere. In some embodiments, the ceilometer may include an optical drum and/or laser ceilometer. In some embodiments, first sensor 108 may include a rain gauge. The rain gauge may be configured to measure precipitation. Precipitation may include rain, snow, hail, sleet, or other precipitation forms. In some embodiments, the rain gauge may include an optical, acoustic, or other rain gauge. In some embodiments, first sensor 108 may include a pyranometer. The pyranometer may be configured to measure solar radiation. In some embodiments, the pyranometer may include a thermopile and/or photovoltaic pyranometer. The pyranometer may be configured to measure solar irradiance on a planar surface. In some embodiments, first sensor 108 may include a lightning detector. The lightning detector may be configured to detect and measure lightning produced by thunderstorms. In some embodiments, first sensor 108 may include a present weather sensor (PWS). The PWS may be configured to detect the presence of hydrometeors and determine their type and intensity. Hydrometeors may include a weather phenomenon and/or entity involving water and/or water vapor, such as, but not limited to, rain, snow, drizzle, hail and sleet.

Still referring to FIG. 1, in one or more embodiments, first sensor 108 may include a local sensor. A local sensor may be any sensor mounted to aerial vehicles 104 that senses objects or phenomena in the environment around aerial vehicles 104. Local sensor may include, without limitation, a device that performs radio detection and ranging (RADAR), a device that performs lidar, a device that performs sound navigation ranging (SONAR), an optical device such as a camera, electro-optical (EO) sensors that produce images that mimic human sight, or the like.

With continued reference to FIG. 1, in one or more embodiments, first sensor 108 may include electrical sensors. Electrical sensors may be configured to measure voltage across a component, electrical current through a component, and resistance of a component. In one or more embodiments, first sensor 108 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within first sensor 108, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

Still referring to FIG. 1, first aerial vehicle 104a include a second sensor 116 configured to measure an aircraft metric. As used in this disclosure, "aircraft metric" is a phenomenon associated with an aerial vehicle's position relative to the earth, motion, and/or components and may include for example, measurements of one or more of a battery charge level; battery temperature; attitude such as pitch, yaw, and roll; torque output; geolocation of an aerial vehicle including longitude, latitude, and altitude; velocity and throttle of aerial vehicles 104; health of an aerial vehicle component such as a motor; and the like. As used in this disclosure, "throttle" refers to aerial vehicles 104 outputting an amount of thrust from, for example, a propulsor. Aerial vehicles 104 may each include second sensor 116. Second sensor 116 may include one or more sensors to detect aircraft metric and generate aircraft datum 120 aircraft datum 120 based on the external metric. As used in this disclosure, "aircraft datum" is one or more elements of data representing aircraft metric. In one or more embodiments, second sensor 116 may include a navigation sensor. For example, and without limitation, a navigation system of aerial vehicles 104 may be provided that is configured to determine a geographical position of aerial vehicles 104 during flight. The navigation may include a Global Positioning System (GPS), an Attitude Heading and Reference System (AHRS), an Inertial Reference System (IRS), radar system, and the like.

Second sensor 116 may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Motion sensor may measure the motion of aerial vehicles 104. Second sensor 116 may include, gyroscope, accelerometer, magnetometer, inertial measurement unit (IMU), pressure sensor, force sensor, proximity sensor, displacement sensor, vibration sensor, or the like. For example, without limitation, second sensor 116 may include a gyroscope that is configured to detect a current aircraft orientation, such as pitch, yaw, and roll angles. An IMU may be configured to detect an angular rate and/or a change in specific force of aerial vehicle. Second sensor 116 may include a rotary torque sensor to measure torque output of motor and generate an output torque datum based on the measured torque output. Output torque datum may be consistent with disclosure of output torque datum in U.S. patent application Ser. No. 17/186,079 filed on Feb. 26, 2021 and titled "METHODS AND SYSTEM FOR ESTIMATING PERCENTAGE TORQUE PRODUCED BY A PROPULSOR CONFIGURED FOR USE IN AN ELECTRIC AIRCRAFT", which is incorporated by reference herein in its entirety.

With continued reference to FIG. 1, second sensor 116 may include sensors to measure the health of components of aerial vehicles 104 including, but not limited to, a motor and a battery. Aerial vehicles 104 may include a motor. As used in this disclosure, "motor" may include an electric motor and may be defined as a device that converts electrical energy into mechanical energy, for instance by causing a shaft to rotate. An electric motor may be driven by direct current (DC) electric power. As an example and without limitation, an electric motor may include a brushed DC electric motor or the like. An electric motor may be, without limitation, driven by electric power having varying or reversing voltage levels, such as alternating current (AC) power as produced by an alternating current generator and/or inverter, or otherwise varying power, such as produced by a switching power source. An electric motor may include, for example and without limitation, brushless DC electric motors, permanent magnet synchronous an electric motor, switched reluctance motors, or induction motors. In addition to inverter and/or a switching power source, a circuit driving an electric motor may include electronic speed controllers (not shown) or other components for regulating motor speed, rotation direction, and/or dynamic braking. Second sensor 116 may include one or more sensors positioned on an exterior surface of motor, within the motor, and remote from the motor to measure motor metrics, such as to measure phenomenon and the overall health of the motor including, without limitation, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Second sensor 116 may include, for example, a vibrometer to measure vibrations of motor, a thermometer to measure the temperature of the motor, a current sensor to measure current through the motor including along the direct axis and quadrature axis of a rotor in the motor, an electromagnetic noise sensor to detect electromagnetic noise associated with the motor, a microphone to detect the noise of motor, and a strain gauge to detect pressure on the motor. Motor metrics may be consistent with disclosure of motor metrics in U.S. patent application Ser. No. 17/528,526 filed on Nov. 17, 2021 and titled "SYSTEMS AND METHODS FOR MONITORING HEALTH OF A MOTOR", which is incorporated herein by reference in its entirety.

Second sensor 116 may measure the health of a battery and circuitry electrically connected to the battery. Second sensor 116 may include a sensor suite which may include a plurality of sensors that may detect similar or unique phenomena, as discussed below. For example, in a non-limiting embodiment, a sensor suite may include a plurality of voltmeters or a mixture of voltmeters and thermocouples. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an electrical power source such as a battery. Independent sensors may include separate sensors measuring physical or electrical quantities that may be powered by and/or in communication with circuits independently, where each may signal sensor output to a control circuit. For example, sensor suite may measure a battery temperature and a battery charge level. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

Still referring to FIG. 1, system 100 includes a computing device 124 operating on first aerial vehicle 104a. First sensor 108 and/or second sensor 116 may be communicatively connected to a processor, pilot control, and/or a controller, such as a computing device 124 so that first sensor 108 and/or second sensor 116 may transmit and/or receive signals including external datum 112 and/or aircraft datum 120 aircraft datum 120. Computing device 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 124 may include a single computing device operating independently, or may include two or more computing device operating in concert, in parallel, sequentially or the like; two or more computing devices may be included together in a single computing device or in two or more computing devices. Computing device 124 may interface or communicate with one or more additional devices as described below in further detail via a network interface device. Network interface device may be utilized for connecting computing device 124 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 124 may include but is not limited to, for example, a computing device or cluster of computing devices in a first location and a second computing device or cluster of computing devices in a second location. Computing device 124 may include one or more computing devices dedicated to data storage, security, distribution of traffic for load balancing, and the like. Computing device 124 may distribute one or more computing tasks as described below across a plurality of computing devices of computing device, which may operate in parallel, in series, redundantly, or in any other manner used for distribution of tasks or memory between computing devices. Computing device 124 may be implemented using a "shared nothing" architecture in which data is cached at the worker, in an embodiment, this may enable scalability of system 100 and/or computing device.

With continued reference to FIG. 1, computing device 124 may be designed and/or configured to perform any method, method step, or sequence of method steps in any embodiment described in this disclosure, in any order and with any degree of repetition. For instance, computing device 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, signals may include electrical, electromagnetic, visual, audio, radio waves, or another undisclosed signal type alone or in combination. In one or more embodiments, computing device 124 may retrieve a desired yaw of aerial vehicles 104. For example, and without limitation, computing device 124 may retrieve a desired yaw from a database. In another example, and without limitation, a desired yaw may be designated by a user, such as a pilot or an operator. A desired yaw may include a desired movement of an aircraft about a yaw axis, such that a desired yaw will alter the direction the aircraft is pointing, or the heading of the aircraft. For example, and without limitations, a desired yaw may be received from a pilot input, where the pilot input may include a collective, inceptor, foot bake, steering and/or control wheel, control stick, pedals, throttle levers, or the like. In one or more embodiments, computing device 124 may be a proportional-integral-derivative (PID)

controller. In some embodiments, computing device 124 may be a processor or a computing device. In other embodiments, computing device 124 may include a processor, which is described further below. In other embodiments, computing device 124 may be a flight controller, which is described further below.

Still referring to FIG. 1, computing device 124 may determine or receive aircraft datum 120 aircraft datum 120 from first sensor 108. For instance, and without limitation, aircraft datum 120 aircraft datum 120 may include a current position of first aerial vehicle 104a (also referred to in this disclosure as a "current aircraft position"). A current aircraft position may include a geographical moment of aerial vehicle. For example, and without limitations, current position of aerial vehicle may include a geographical location and/or an orientation of aerial vehicle. A current aircraft location may include any data describing a geographical moment of aerial vehicle at present time. Current aircraft location may be continually received by computing device 124 so that the geographical moment of aerial vehicles 104 is always known by computing device 124 or a user, such as a pilot. In one or more embodiments, a current aircraft position may be provided by, for example, a global positioning system (GPS).

Figure 6:
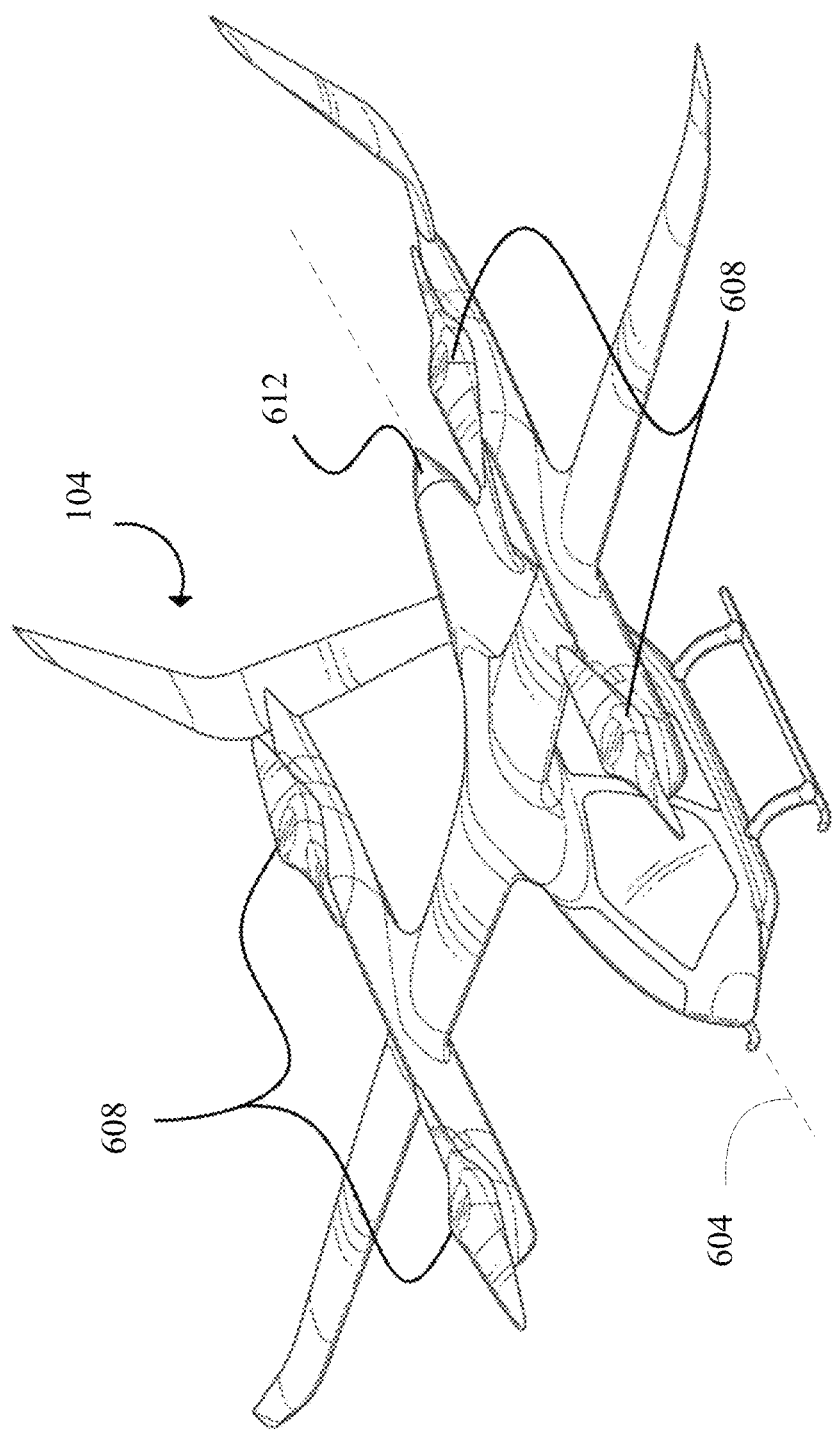
FIG. 6 is a perspective view of an exemplary aerial vehicle according to an embodiment of the present disclosure.

With continued reference to FIG. 1, computing device 124 may be configured to generate, as a function of external datum 112 and/or aircraft datum 120 aircraft datum 120, at least an aircraft command 128. In one or more embodiments, aircraft command 128 may be an attitude command. Aircraft command may include a command datum that is transmitted to a flight component, such as one or more propellers. An "aircraft command", for the purposes of this disclosure, is an electronic signal representing at least an element of data correlated to pilot and/or computing device 124 input representing a desired operation of a flight component of an aircraft. Aircraft command 128 may be a signal to change the heading or trim of aerial vehicle. Aircraft command 128 may be a signal to change an aircraft's pitch, roll, yaw, or throttle. Aircraft trajectory is manipulated by one or more flight components, such as control surfaces, and propulsors working alone or in tandem consistent with the entirety of this disclosure. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. "Roll" for the purposes of this disclosure, refers to an aircraft's position about its longitudinal axis 604, as illustrated in FIG. 6, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Aircraft command 128 may include an electrical signal. Aircraft command 128 may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include circuitry, computing devices, electronic components or a combination thereof that translates pilot input into at least an aircraft command configured to be transmitted to another electronic component. Aircraft command 128 may include un updated flight plan for aerial vehicle.

Still referring to FIG. 1, computing device 124 may include a processor. A processor may include an artificial intelligence configured to process datum from first sensor 108 and second sensor 116. In some embodiments, the processor may include a machine-learning model configured to process datum from first sensor 108, second sensor 116, and/or pilot input. A processor may be configured to output an optimal flight trajectory to flight computing device 124 of aerial vehicle 104a. In some embodiments, processor may be configured to output an optimal flight trajectory for a second aerial vehicle 104b to flight computing device 124. Second aerial vehicle 104b may be similar to first aerial vehicle 104a. An optimal flight trajectory may include a flight plan to provide wind compensation. Wind-compensated flight trajectory may include a function of aerodynamics and propulsion systems of aerial vehicle. For example, a function of thrust coefficients may be included, as discussed further below in this disclosure. In one or more embodiments, a processor may be in communication with computing device 124. In some embodiments, a processor may be configured to transmit data to computing device 124. In some embodiments, data may include a flight plan, flight commands, flight alerts, external datum 112 and/or aircraft datum 120 aircraft datum 120. In some embodiments, computing device 124 may be in communication with first sensor 108. Thus, computing device 124 may update flight controls, plans, and projected trajectory of aerial vehicle based on data from first sensor 108. In some embodiments, computing device 124 may update flight controls, plans, and projected trajectory of aerial vehicle based on an outside input, such as a user input.

In some embodiments, and with continued reference to FIG. 1, computing device 124 may be configured to determine one or more sequences in an optimal flight trajectory of aerial vehicle. For example, and without limitations, computing device 124 may utilize a plant model to determine an optimal flight trajectory of aerial vehicle, as discussed further below. In some embodiments, an optimal flight trajectory may include a plurality of parameters. The plurality of parameters of the optimal trajectory may include, but is not limited to, current position of aerial vehicle and desired position of aerial vehicle, such as desired yaw. In some embodiments, a processor may be positioned in an external computing system. In some embodiments, an external computing system may receive data from first sensor 108; thus, computing device 124 may send an optimal flight trajectory to aerial vehicle. For example, and without limitation, computing device 124 may send an optimal flight trajectory to aerial vehicle wirelessly.

With continued reference to FIG. 1, computing device 124 may perform one or more mathematical operations, manipulations, arithmetic, machine-learning, or a combination thereof on one or more elements of data. Computing device 124 may be designed to provide a linear approximation of a nonlinear system. Linearization is a linear approximation of a nonlinear system that is valid in a small region around an operating point. Linearization may be employed in higher order systems such that inputs and outputs may be more easily controlled using a control loop. For example, and without limitations, linearization can be used with feedforward control, open loop control, feedback control, among others, alone or in combination.

System 100 may include a plant model. A "plant model", for the purposes of this disclosure, is a component of control theory which includes a process and an actuator. A plant model is often referred to with a transfer function which indicates the relation between an input signal and the output signal of a system without feedback, commonly determined by physical properties of the system. In a system with feedback, as in illustrative embodiments described in this disclosure, a plant still has the same transfer function, but a control unit and a feedback loop, which possess their own transfer functions, are added to the system. Plant model 132 may include one or more computer models representing rigid body mechanics, rigid body dynamics, or a combination thereof. A "rigid body", for the purposes of this disclosure, is a solid body in which deformation is zero or so small it can be neglected. For example, the distance between any two given points on a rigid body remains constant in time regardless of the external forces or moments exerted on it. Additionally, a rigid body is usually considered as a continuous distribution of mass. The position, kinematic, and kinetic quantities describing the motion of a rigid body include linear and angular components, respectively.

With continued reference to FIG. 1, plant model 132 may be configured to generate a flight trajectory datum 136. A "flight trajectory datum", for the purposes of this disclosure, is one or more elements of data representing desired moments used for wind compensation by altering an aircraft's heading and/or orientation. Desired moments may include a yaw moment, roll moment, rotation transformation model, and/or a pitch moment. Flight trajectory datum 136 may be generated to provide angle of attack (AoA). An "angle of attack", for the purposes of this disclosure, is the relative angle between a reference line on a body, and the vector representing the relative motion between the body and the fluid through which it is moving. In other words, angle of attack, is the angle between the body's reference line and the oncoming flow. The reference line may include the farthest two points on the rigid body such that the line approximates the length of the rigid body. For example, and without limitation, a reference line may be a longitudinal central axis of aerial vehicle. Plant model 132 is utilized to solve for an optimal flight trajectory datum is shown. Plant model 132 includes a mathematical problem, including matrices, to provide an optimal flight trajectory based on geographical datum 120 from first sensor 108. Flight trajectory datum 136 may be a function of external datum 112 and/or aircraft datum 120 aircraft datum 120. For example, computing device 124 may receive external datum 112 and/or aircraft datum 120 aircraft datum 120 from first sensor 108 and transmit the external datum 112 and/or the aircraft datum 120 aircraft datum 120 to plant model 132. In some embodiments, computing device 124 may process external datum 112 and/or aircraft datum 120 aircraft datum 120 and transmit resulting data to plant model 132. Plant model 132 may then generate flight trajectory datum 136 based, directly or indirectly, on external datum 112 and/or aircraft datum 120 aircraft datum 120. Computing device 124 may receive flight trajectory datum 136 from plant model 132 and generate aircraft command 128, which may be based on external datum 112 and/or aircraft datum 120 aircraft datum 120. In some embodiments, this process may be automated so that updated aircraft command 128 is generated as needed according to external datum 112 and/or aircraft datum 120 received from sensors 108, altering the flight of aerial vehicle. In a non-limiting example, plant model 132 may predict an optimal trajectory that follows a path through windy weather based on external datum 112 including wind velocity. Plant model may be consistent with disclosure of plant model in U.S. patent application Ser. No. 17/515,420 filed on Oct. 30, 2021 and titled "SYSTEMS AND METHODS FOR WIND COMPENSATION OF AN ELECTRIC AIRCRAFT", which is incorporated herein by reference in its entirety.

With continued reference to FIG. 1, computing device 124 is communicatively connected to a network 136 including at least a second aerial vehicle 104b. network 140 System 100 may be connected to any number of aerial vehicles 104. Computing device 124 is configured to receive external datum 112 from first sensor 108 and/or aircraft datum 120 aircraft datum 120 from second sensor 116 of first aerial vehicle 104a. Computing device 124 is configured to transmit 148 at least a flight plan update element 144 to network 136. As used in this disclosure, "flight plan update element" is an element of data which is used to update a flight plan. 148 at least a flight plan update element 144 may include information necessary for developing an updated flight plan. For example, 148 at least a flight plan update element 144 may include external datum 112 such as datum concerning wind velocity and aircraft datum 120 aircraft datum 120 such as datum identifying the geolocation of first aerial vehicle 104a and thus the geolocation of the detected wind velocity, which may be substantial enough to update a flight plan accordingly. In some embodiments, at least a flight plan update element 140 may include raw datum from first sensor 108 and/or second sensor 116 on first aerial vehicle 104a, such as external datum 112 and/or aircraft datum 120 aircraft datum 120. In some embodiments, 148 at least a flight plan update element 144 may include information resulting from processing raw datum. For example, 148 at least a flight plan update element 144 may include information output by computing device 124 after processing at least raw datum. The information may be fully processed or partially processed information for an updated flight plan for second aerial vehicle 104b. In other words, at least a flight plan 140 may be a complete updated flight plan for second aerial vehicle 104b or at least a flight plan 140 may include datum for computing device 124 of second aerial vehicle 104b to process to output an updated flight plan.

Network 140 may include a mesh network. As used in this disclosure, a "mesh network" is a network in which computing devices, also called nodes, each relay data for the network; nodes 148 are communicatively linked together, either directly or indirectly, and branch off other nodes 148. Node 148 may be computing device 124 in each aerial vehicle or the nodes 148 may be computing devices communicatively connected to the corresponding controllers in each aerial vehicle. Mesh network may be a full mesh network in which each node 148 is connected directly to all other nodes 148. In some embodiments, mesh network may be a partial mesh network, in which only some nodes 148 connect directly to one another. In a partial mesh network, a first node 148 may require to communicated through a second node 148 to reach a third node 148 wherein the second node 148 received data from the first node 148 and transmits it to the third node 148. Mesh network may include multiple routers, switches, or other devices. Mesh network may use a routing technique such that data is propagated along a communication path from node 148 to node 148 until the destination is reached. In some embodiments, mesh network may use a flooding technique in which a message is sent to all nodes 148 in the mesh network, thus requiring no routing. Network 140 may be configured to use a flooding technique, wherein data is transmitted to all nodes 148 in the network 140. In some embodiments, network 140 may incorporate time division multiple access and high-accuracy synchronization to allow retransmissions to occur simultaneously so the data propagates one hop in all directions at precisely the same time and avoids collisions. As used in this disclosure, a "hop" is a direct transmission of data from one node 148 to another node 148. In some embodiments, at each hop, nodes 148 retransmit only information determined as relevant by one or more computing devices. The number of retransmissions may be the number of hops in network 140 to avoid unnecessary retransmissions. In some embodiments, network 140 may be configured to use a routing technique in which data is passed along designated nodes 148 forming a determined route until the destination is reached.

Still referring to FIG. 1, network 140 may be configured to provide swarm communication among aerial vehicles 104. In some embodiments, network 140 may be configured for one of aerial vehicles 104 to communicate directly to one or more other of aerial vehicles 104. In some embodiments, network 140 may be configured for a plurality of aerial vehicles 104 to communicate directly to one or more other of aerial vehicles 104. Network 140 may be configured for all of aerial vehicles 104 to communicate directly to one or more other of aerial vehicles 104. In some embodiments, network 140 may be configured for all of aerial vehicles 104 to communicate directly to all other of aerial vehicles 104. In some embodiments, some of aerial vehicles 104 are configured to communicate directly with a greater number of the aerial vehicles 104 than the number of aerial vehicles 104 with which other aerial vehicle are configured to communicate directly.

With continued reference to FIG. 1, aerial vehicles 104 may operate simultaneously as a fleet. A first of aerial vehicles 104 flying ahead of the other aerial vehicles 104 may generate external datum 112 and/or aircraft datum 120 aircraft datum 120 from first sensor 108 that computing device 124 and/or plant model 132 determines is pertinent to altering a flight path. In some embodiments, computing device 124 of the first of aerial vehicles 104 automates aircraft command 128 to update the flight path. In some embodiments, node 148 of the first of aerial vehicles 104 transmits the external datum 112 and/or aircraft datum 120 aircraft datum 120, resulting flight trajectory datum 136, and/or resulting aircraft command 128 to all other aerial vehicles 104. The data may be transmitted directly to all other aerial vehicles 104. In some embodiments, the data may be transmitted directly to less than all other aerial vehicles 104, and the remaining aerial vehicles 104 may receive from other aerial vehicles 104 that received the data directly or indirectly from the first of aerial vehicles 104. Nodes 148 of aerial vehicles 104 that receive the transmitted data may automatically update the corresponding flight path. In some embodiments, the entire flight plan from current location to destination may automatically be updated according to the external datum 112 and/or aircraft datum 120 aircraft datum 120. In some embodiments, the updated flight plan may be the same for all of aerial vehicles 104. In other embodiments, the updated flight plan may differ among aerial vehicles 104 base on, for example, each of aerial vehicles 104 relative positions or other external metric and/or aircraft metric. In some embodiments, network 140 is configured to control all of aerial vehicles 104 as a single aircraft. In some embodiments, network 140 is configured to transmit external metric, such as aerial vehicle position, and/or aircraft metric, such as aerial vehicle velocity, between the aerial vehicles 104 to automatically update their corresponding flight paths to maintain consistent displacements between them.

In some embodiments, network 140 may include an infrastructure-based swarm architecture. Network 140 may include a ground control station (GCS) that is configured to receive data including telemetry data from aerial vehicles 104, and aerial vehicles 104 may be configured to send data including telemetry data to GCS. In these embodiments, aerial vehicles 104 receive data for coordination from GCS.

Still referring to FIG. 1, in some embodiments, network 140 may include an ad-hoc protocol, also known as a flying ad-hoc network architecture, and may be configured for all of aerial vehicles 104 to communicate directly with each other. As used in this disclosure, an "ad-hoc protocol" is a wireless network that relies on the dynamic assignment and reassignment of nodes 148 in a network based on dynamic routing algorithms to establish communication. Accordingly, an ad-hoc protocol does not rely on existing infrastructure to establish the network. Decision making is distributed as the entire fleet of aerial vehicles 104 is not dependent on an infrastructure to execute the desired flight path, which provides built-in redundancy.

In some embodiments, network 140 may include an adapted version of ad-hoc protocol wherein all of aerial vehicles 104 are configured to transmit metric datum and/or aircraft datum 120 aircraft datum 120 directly to each other and decision making is distributed among the aerial vehicles 104. Distributed decision making may be based on formal logic, machine learning, and/or other distributed control algorithms known by one skilled in the art. In some embodiments, one of aerial vehicles 104 is configured to transmit and/or receive data via a cellular network infrastructure.

Figure 2:
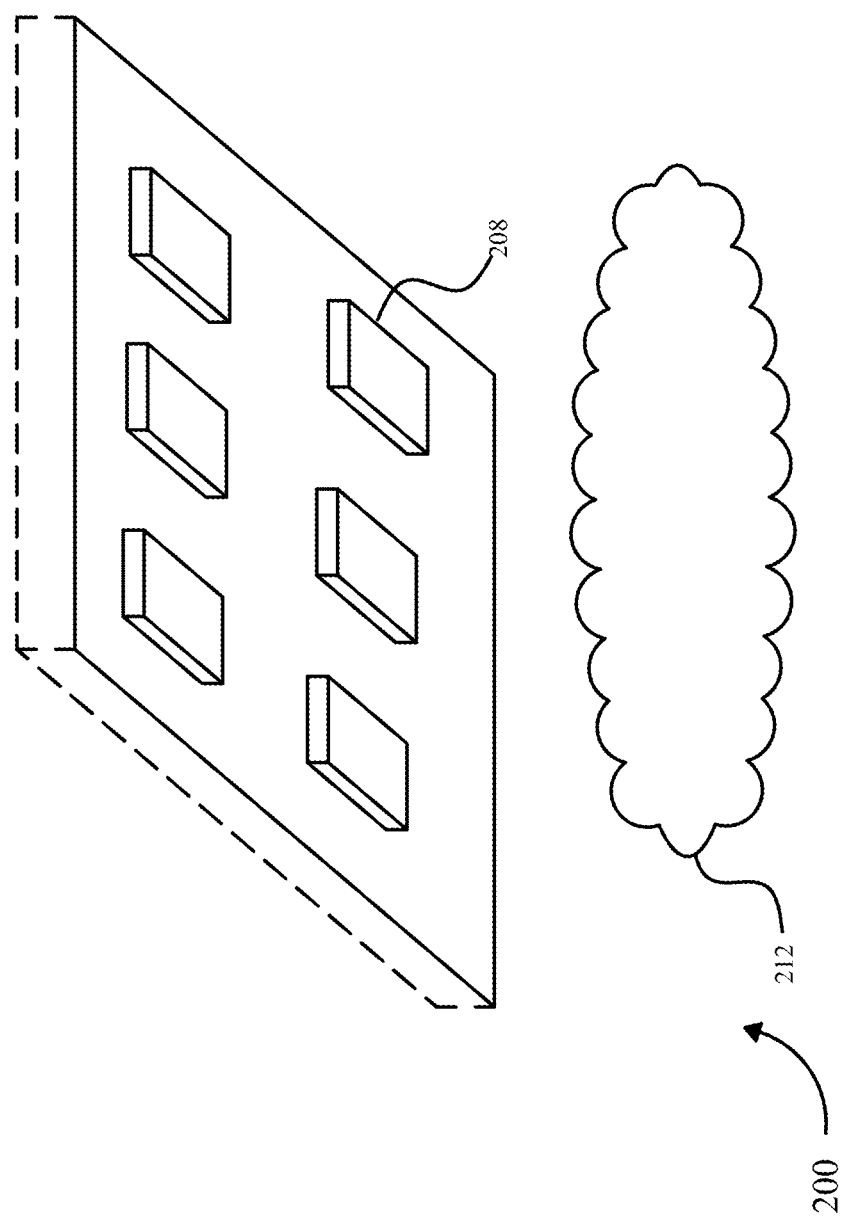
FIG. 2 is a schematic diagram illustrating an exemplary sensor suite according to an embodiment of the present disclosure.

Referring now to FIG. 2, an exemplary embodiment of sensor suite 200 is presented in accordance with one or more embodiments of the present disclosure. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors communicatively connected to a charging connection measuring operating conditions of the communication such as temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of first sensor 108 to detect phenomenon is maintained.

Sensor suite 200 may include a moisture sensor 204. There are three primary measurements of humidity: absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 204 may be psychrometer. Moisture sensor 204 may be a hygrometer. Moisture sensor 204 may be configured to act as or include a humidistat. A "humidistat", for the purposes of this disclosure, is a humidity-triggered switch, often used to control another electronic device. Moisture sensor 204 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 2, sensor suite 200 may include electrical sensors 208. Electrical sensors 208 may be configured to measure voltage of a charging connection, electrical current of charging connection, and resistance of charging connection. Electrical sensors 208 may include separate sensors to measure each of the previously disclosed electrical characteristics such as voltmeter, ammeter, and ohmmeter, respectively. Sensor suite 200 may include a sensor or plurality thereof that may detect voltage and direct the charging of individual battery cells of a power source according to charge level; detection may be performed using any suitable component, set of components, and/or mechanism for direct or indirect measurement and/or detection of voltage levels, including without limitation comparators, analog to digital converters, any form of voltmeter, or the like. Sensor suite 200 and/or a control circuit incorporated therein and/or communicatively connected thereto may be configured to adjust charge to one or more battery cells as a function of a charge level and/or a detected parameter. For instance, and without limitation, sensor suite 200 may be configured to determine that a charge level of a battery cell of a power source is high based on a detected voltage level of that battery cell or portion of the power source and/or battery pack. Sensor suite 200 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 200 may include digital sensors, analog sensors, or a combination thereof. Sensor suite 200 may include digital-to-analog converters (DAC), analog-to-digital converters (ADC, A/D, A-to-D), a combination thereof, and the like.

With continued reference to FIG. 2, sensor suite 200 may include thermocouples, thermistors, thermometers, passive infrared sensors, resistance temperature sensors (RTD's), semiconductor based integrated circuits (IC), a combination thereof or another undisclosed sensor type, alone or in combination. For example, sensor suite 200 may include one or more temperature sensors to measure battery temperature.

With continued reference to FIG. 2, sensor suite 200 may include a sensor configured to detect gas that may be emitted during or after a cell failure. "Cell failure", for the purposes of this disclosure, refers to a malfunction of a battery cell of a power source, which may be an electrochemical cell, that renders the cell inoperable for its designed function, namely providing electrical energy to at least a portion of an electric aircraft. Byproducts of cell failure 212 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 200, may be configured to detect combustible, flammable, toxic, oxygen depleted, a combination thereof, or another type of gas alone or in combination. The gas sensor that may be present in sensor suite 200 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 200 may include sensors that are configured to detect non-gaseous byproducts of cell failure 212 including, in non-limiting examples, liquid chemical leaks including aqueous alkaline solution, ionomer, molten phosphoric acid, liquid electrolytes with redox shuttle and ionomer, and salt water, among others. Sensor suite 200 may include sensors that are configured to detect non-gaseous byproducts of cell failure 212 including, in non-limiting examples, electrical anomalies as detected by any of the previous disclosed sensors or components.

With continued reference to FIG. 2, sensors 208 may be disposed on a sense board 216. In one or more embodiments, sense board 216 may include opposing flat surfaces and may be configured to cover a portion of a battery module within a power source, such as a battery pack. Sense board 216 may include, without limitation, a control circuit configured to perform and/or direct any actions performed by sense board 216 and/or any other component and/or element described in this disclosure. Sense board 216 may be consistent with the sense board disclosed in U.S. patent application Ser. No. 16/948,140 entitled, "SYSTEM AND METHOD FOR HIGH ENERGY DENSITY BATTERY MODULE" and incorporated herein by reference in its entirety.

With continued reference to FIG. 2, sensor suite 200 may be configured to detect events where voltage nears an upper voltage threshold or lower voltage threshold. The upper voltage threshold may be stored in a memory of, for example, a computing device for comparison with an instant measurement taken by any combination of sensors present within sensor suite 200. The upper voltage threshold may be calculated and calibrated based on factors relating to battery cell health, maintenance history, location within battery pack, designed application, and type, among others. Sensor suite 200 may measure voltage at an instant, over a period of time, or periodically. Sensor suite 200 may be configured to operate at any of these detection modes, switch between modes, or simultaneous measure in more than one mode. First sensor 108 may detect through sensor suite 200 events where voltage nears the lower voltage threshold. The lower voltage threshold may indicate power loss to or from an individual battery cell or portion of the battery pack. First sensor 108 may detect through sensor suite 200 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation. Additional disclosure related to a battery management system may be found in U.S. patent application Ser. Nos. 17/111,002 and 17/108,798 entitled "SYSTEMS AND METHODS FOR A BATTERY MANAGEMENT SYSTEM INTEGRATED IN A BATTERY PACK CONFIGURED FOR USE IN ELECTRIC AIRCRAFT", both of which are incorporated in their entirety herein by reference.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Figure 3:
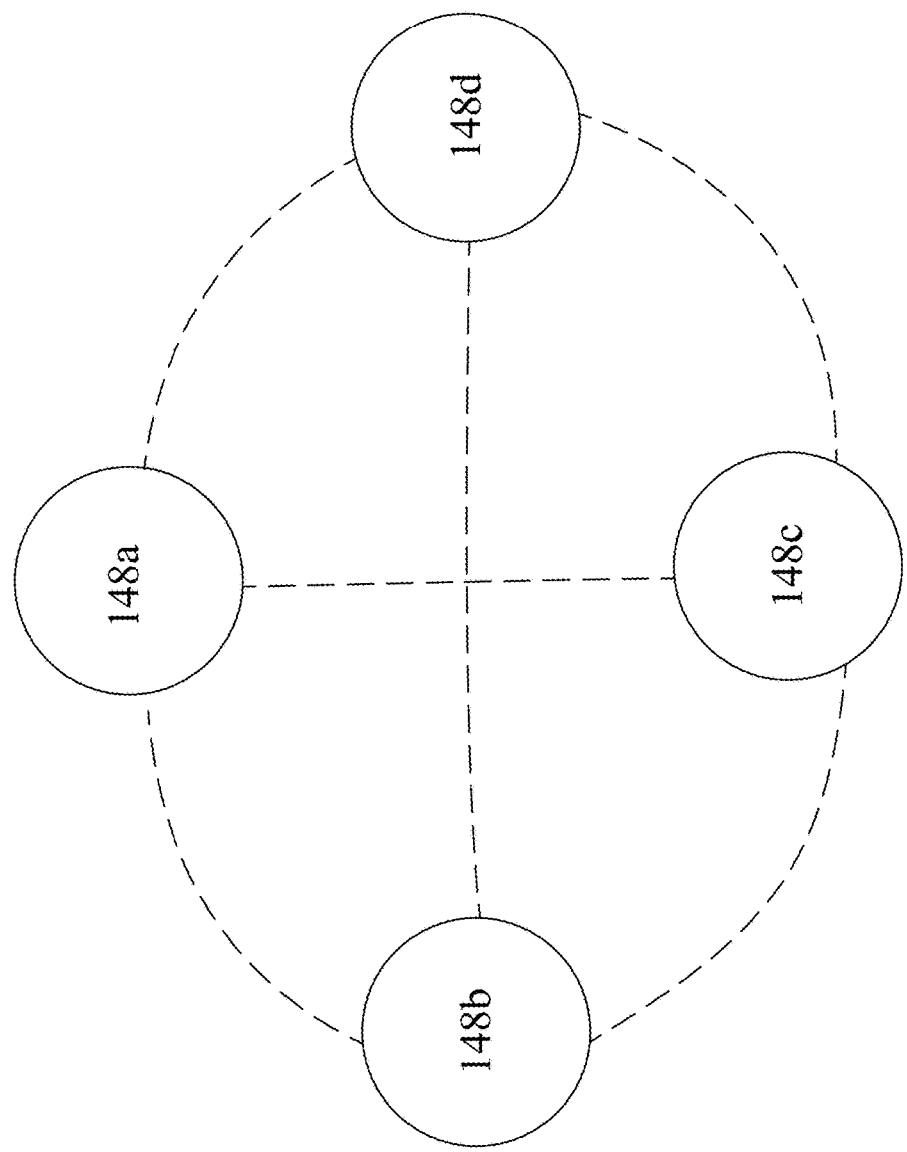
FIG. 3 is a block diagram illustrating an exemplary network system according to an embodiment of the present disclosure.

Referring now to FIG. 3, an exemplary embodiment of a network system 300 for a mesh network for aerial vehicles is illustrated. Network system 300 may include nodes 148. A "node" as used in this disclosure is a computing device that is configured to receive and transmit data to another computing device. As discussed previously, the controller in each aerial vehicle may be a node 148 or the nodes 148 may be communicatively connected to the corresponding computing device 124, as illustrated in FIG. 1, of the aerial vehicle. Each of nodes 148 may include and/or communicate with any computing device as described in this disclosure, including without limitation a microcontroller, microprocessor, digital signal processor (DSP) and/or system on a chip (SoC) as described in this disclosure. Further, nodes 148 may include a single computing device operating independently, or may include two or more computing device operating in concert, in parallel, sequentially or the like; two or more computing devices may be included together in a single computing device or in two or more computing devices. In embodiments, nodes 148 may be installed in an aircraft, may control the aircraft remotely, and/or may include an element installed in the aircraft and a remote element in communication therewith. Still referring to FIG. 3, network system 300 may include a plurality of nodes. In some embodiments, network system 300 may include a first node 148a and may include and/or communicate with a second node 148b. In some embodiments, network system 300 may include and/or communicate with a third node 148c. In some embodiments, network system 300 may include and/or communicate with a fourth node 148d. For purposes of discussion, this disclosure will describe interactions between four nodes, but network system 300 may include any number of nodes including more than four nodes or less than four nodes. A node may include any computing device, such as, but not limited to, aerial vehicle, a laptop, a smartphone, a tablet, a command deck, a recharging pad, and/or other computing devices. In some embodiments, first node 148a may include a flight controller of aerial vehicle. In some embodiments, first node 148a, second node 148b, third node 148c, and fourth node 148d may include a flight controller of aerial vehicle. In some embodiments, first node 148a may be configured to transmit and receive data from second node 148b, third node 148c, and/or fourth node 148d. In some embodiments, second node 148b may be configured to transmit and receive data from first node 148a, third node 148c, and/or fourth node 148d. In some embodiments, third node 148c may be configured to transmit and receive data from first node 148a, second node 148b, and/or fourth node 148d. In some embodiments, fourth node 148d may be configured to transmit and receive data from first node 14, second node 148b, and/or third node 148c. A node of network system 300 may be configured to communicate data to another node of network system 300. Data may include, but is not limited to, one or more external metric and/or one or more aircraft metric.

With continued reference to FIG. 3, in some embodiments, data may include communication efficiency feedback. "Communication efficiency feedback," as used in this disclosure, is any data concerning effectiveness of data transmission. In some embodiments, communication efficiency feedback may include, but is not limited to, signal strength, signal-noise ratio, error rate, availability of a higher-efficiency mode, physical trajectory of a second node, project change over time, relative strength of a third node, and the like. In some embodiments, network system 300 may include and/or communicate with an initial recipient node. An "initial recipient node" as used in this disclosure is any node first transmitted to in a network. In some embodiments, first node 148a may include an initial recipient node. First node 148a may transmit data to second node 148b. Second node 148b may transmit communication efficiency feedback to another node of network system 300. In some embodiments, communication efficiency feedback may be based on data transmission times between two or more nodes. Communication efficiency feedback may be explicit. Explicit communication efficiency feedback may include second node 148b providing information to first node 148a about transmission times, error rates, signal-noise ratios, and the like. In some embodiments, second node 148b may provide communication efficiency feedback to first node 148a about one or more other nodes in network system 300. Communication efficiency feedback about one or more other nodes of network system 300 may include, but is not limited to, transmission speed, signal strength, error rate, signal-noise ratio, physical trajectory, availability, projected change over time, and the like. First node 148*a* may use communication efficiency feedback of second node 148*b* and/or one or more other nodes of network system 300 to select an initial recipient node. Communication efficiency feedback may alternatively or additionally be implicit. Implicit communication efficiency feedback may include first node 148*a* detecting communication parameters such as, but not limited to, transmission speed, error rate, signal strength, physical trajectory, signal-noise ratio, and the like. First node 148*a* may determine one or more communication parameters based on a transmission between first node 148*a* and one or more other nodes of network system 300. In some embodiments, first node 148*a* may store communication parameters of one or more other nodes. In a non-limiting example, first node 148*a* may store communication parameters of second node 148*b* which may include that second node 148*b* may have a high signal-noise ratio. First node 148*a* may search for another node of network system 300 to select as an initial recipient node based on stored communication parameters of second node 148*b*. In some embodiments, first node 148*a* may compare one or more communication parameters of a communication efficiency feedback of one or more nodes to select an initial recipient node. First node 148*a* may compare a communication efficiency feedback to a communication threshold. A "communication threshold" as used in this disclosure is any minimum or maximum value of a communication metric. A communication threshold may include, but is not limited to, an error rate, a transmission speed, a signal-noise ratio, a physical trajectory, a signal strength, and the like. In some embodiments, first node 148*a* may receive data from second node 148*b* about a third node, fourth node, etc. Data about a third node, fourth node, etc. may include communication efficiency feedback. First node 148*a* may use data received from second node 148*b* about another node to select from a plurality of nodes of network system 300. First node 148*a* may utilize a machine-learning model to predict an optimal communication pathway of nodes. A machine-learning model may be trained on training data correlating communication parameters to selected initial recipient nodes. Training data may be obtained from prior transmissions, stored data of one or more nodes, and/or received from an external computing device. In some embodiments, training data may be obtained from a user input. First node 148*a* may utilize a machine-learning model to compare one or more nodes based on one or more communication parameters for an optimal pathway selection. A machine-learning model may be as described below.

Still referring to FIG. 3, first node 148*a* may generate an objective function to compare communication parameters of two or more nodes. An "objective function" as used in this disclosure is a process of maximizing or minimizing one or more values based on a set of constraints. In some embodiments, an objective function of generated by first node 148*a* may include an optimization criterion. An optimization criterion may include any description of a desired value or of values for one or more attributes of a communication pathway; desired value or range of values may include a maximal or minimal value, a range between maximal or minimal values, or an instruction to maximize or minimize an attribute. As a non-limiting example, an optimization criterion of at least an optimization criterion may specify that a communication should have a fast transmission time; an optimization criterion may cap error rates of a transmission. An optimization criterion may specify one or more thresholds for communication parameters in transmission pathways. An optimization criterion may specify one or more desired physical trajectories for a communication pathway. In an embodiment, at least an optimization criterion may assign weights to different attributes or values associated with attributes; weights, as used herein, may be multipliers or other scalar numbers reflecting a relative importance of a particular attribute or value. As a non-limiting example, minimization of response time may be multiplied by a first weight, while a communication threshold above a certain value may be multiplied by a second weight. Optimization criteria may be combined in weighted or unweighted combinations into a function reflecting an overall outcome desired by a user; function may be a communication function to be minimized and/or maximized. Function may be defined by reference to communication constraints and/or weighted aggregation thereof; for instance, a communication function combining optimization criteria may seek to minimize or maximize a function of communication constraints.

Still referring to FIG. 3, first node 148*a* may use an objective function to compare second node 104 to one or more other nodes. Generation of an objective function may include generation of a function to score and weight factors to achieve a communication score for each feasible pairing. In some embodiments, pairings may be scored in a matrix for optimization, where columns represent nodes and rows represent communications potentially paired therewith; each cell of such a matrix may represent a score of a pairing of the corresponding node to the corresponding communication. In some embodiments, assigning a predicted process that optimizes the objective function includes performing a greedy algorithm process. A "greedy algorithm" is defined as an algorithm that selects locally optimal choices, which may or may not generate a globally optimal solution. For instance, first node 148*a* may select pairings so that scores associated therewith are the best score for each order and/or for each process. In such an example, optimization may determine the combination of processes such that each object pairing includes the highest score possible.

Still referring to FIG. 3, an objective function may be formulated as a linear objective function. First node 148*a* may solve objective function 144 using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all nodes r, S is a set of all communications s, $c_{rs}$ is a score of a pairing of a given node with a given communication, and $x_{rs}$ is 1 if a node r is paired with a communication s, and 0 otherwise. Continuing the example, constraints may specify that each node is assigned to only one communication, and each communication is assigned only one node. Communications may include communications and/or transmissions as described above. Sets of communications may be optimized for a maximum score combination of all generated communications. In various embodiments, first node 148*a* may determine a combination of nodes that maximizes a total score subject to a constraint that all nodes are paired to exactly one communication. In some embodiments, not all communications may receive a node pairing since each communication may only use one node. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on first node 148a and/or another device in network system 300, and/or may be implemented on third-party solver.

With continued reference to FIG. 3, optimizing an objective function may include minimizing a loss function, where a "loss function" is an expression an output of which an optimization algorithm minimizes to generate an optimal result. As a non-limiting example, first node 148a may assign variables relating to a set of parameters, which may correspond to a score of communications as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of response times. Objectives may include minimization of error rate of transmission. Objectives may include minimization of nodes used. Objectives may include minimization of signal-noise ratio. Objectives may include minimization of physical trajectory.

Still referring to FIG. 3, first node 148a may use a fuzzy inferential system to determine an initial recipient node. "Fuzzy inference" is the process of formulating a mapping from a given input to an output using fuzzy logic. "Fuzzy logic" is a form of many-valued logic in which the truth value of variables may be any real number between 0 and 1. Fuzzy logic may be employed to handle the concept of partial truth, where the truth value may range between completely true and completely false. The mapping of a given input to an output using fuzzy logic may provide a basis from which decisions may be made and/or patterns discerned. A first fuzzy set may be represented, without limitation, according to a first membership function representing a probability that an input falling on a first range of values is a member of the first fuzzy set, where the first membership function has values on a range of probabilities such as without limitation the interval [0,1], and an area beneath the first membership function may represent a set of values within the first fuzzy set. A first membership function may include any suitable function mapping a first range to a probability interval, including without limitation a triangular function defined by two linear elements such as line segments or planes that intersect at or below the top of the probability interval.

Still referring to FIG. 3, a first fuzzy set may represent any value or combination of values as described above, including communication parameters. A second fuzzy set, which may represent any value which may be represented by first fuzzy set, may be defined by a second membership function on a second range; second range may be identical and/or overlap with first range and/or may be combined with first range via Cartesian product or the like to generate a mapping permitting evaluation overlap of first fuzzy set and second fuzzy set. Where first fuzzy set and second fuzzy set have a region that overlaps, first membership function and second membership function may intersect at a point representing a probability, as defined on probability interval, of a match between first fuzzy set and second fuzzy set. Alternatively or additionally, a single value of first and/or second fuzzy set may be located at a locus on a first range and/or a second range, where a probability of membership may be taken by evaluation of a first membership function and/or a second membership function at that range point. A probability may be compared to a threshold to determine whether a positive match is indicated. A threshold may, in a non-limiting example, represent a degree of match between a first fuzzy set and a second fuzzy set, and/or single values therein with each other or with either set, which is sufficient for purposes of the matching process. In some embodiments, there may be multiple thresholds. Each threshold may be established by one or more user inputs. Alternatively or additionally, each threshold may be tuned by a machine-learning and/or statistical process, for instance and without limitation as described in further detail below.

Still referring to FIG. 3, first node 148a may use a fuzzy inference system to determine a plurality of outputs based on a plurality of inputs. A plurality of outputs may include a communication efficiency of one or more nodes. A plurality of inputs may include communication efficiency feedback as described above. In a non-limiting example, first node 148a may detect that second node 148b may have slow response time and a far physical trajectory. First node 148a may determine, using fuzzy logic, that second node 148b is "too far" for selection as an initial recipient node. In another non-limiting example, first node 148a may detect that second node 148b may have a high transmission speed and a close physical trajectory. First node 148a may determine that second node 148b has a "strong signal".

Still referring to FIG. 3, first node 148a may determine a connectivity of a plurality of potential initial recipient nodes. First node 148a may determine, using any process described in this disclosure, an optimal initial recipient node according to a selection criteria. A selection criteria may include, but is not limited to, physical trajectory, projected change over time, signal strength, error rate, transmission speeds, response times, neighboring nodes, and the like. In some embodiments, each node of network system 300 may iteratively ID initial recipient nodes and calculate a best option score and an average score. Each node may send a best option score and/or an average score to all nodes of network system 300. A node of network system 300 may calculi and update a best option score and/or an average score based on data received from other nodes of network system 300. In some embodiments, by having each node update a best option score and average score of their own initial recipient nodes, first node 148a may select an initial recipient node based on robustness and speed of each possible pathway of other nodes of network system 300.

In some embodiments, and continuing to refer to FIG. 3, first node 148a may be generated from a flight controller of an aircraft. In some embodiments, all nodes of network system 300 may be generated from a flight controller of an aircraft. In some embodiments, one node of network system 300 may be generated from an aircraft and another node may be generated from a landing pad and/or recharging station. In some embodiments, a node 104 may be generated from an electric aircraft and may communicate charging data to node 108 which may be generated from a charging infrastructure. An electric aircraft may communicate with a charging infrastructure through one or more nodes of network system 300. Communication between an electric aircraft and a charging infrastructure may include, but is not limited to, data communication about charge status of an electric aircraft, charging standards of an electric aircraft, charging compatibility of the charger and the electric aircraft, estimated charging times, and the like.

Still referring to FIG. 3, in some embodiments, network system 300 may include, participate in, and/or be incorporated in a network topology. A "network topology" as used in this disclosure is an arrangement of elements of a communication network. In some embodiments, network system 300 may include, but is not limited to, a star network, tree network, and/or a mesh network. A "mesh network" as used in this disclosure is a local network topology in which the infrastructure nodes connect directly, dynamically, and non-hierarchically to as many other nodes as possible. Nodes of network system 300 may be configured to communicate in a partial mesh network. A partial mesh network may include a communication system in which some nodes may be connected directly to one another while other nodes may need to connect to at least another node to reach a third node. In some embodiments, network system 300 may be configured to communicate in a full mesh network. A full mesh network may include a communication system in which every node in the network may communicate directly to one another. In some embodiments, network system 300 may include a layered data network. As used in this disclosure a "layered data network" is a data network with a plurality of substantially independent communication layers with each configured to allow for data transfer over predetermined bandwidths and frequencies. As used in this disclosure a "layer" is a distinct and independent functional and procedural tool of transferring data from one location to another. For example, and without limitation, one layer may transmit communication data at a particular frequency range while another layer may transmit communication data at another frequency range such that there is substantially no cross-talk between the two layers which advantageously provides a redundancy and safeguard in the event of a disruption in the operation of one of the layers. A layer may be an abstraction which is not tangible.

Still referring to FIG. 3, in some embodiments, network system 300 may include first node 148a, second node 148b, third node 148c, and/or fourth node 148d. First node 148a may be configured to communicate with a first layer providing radio communication between nodes at a first bandwidth. In some embodiments, first node 148a may be configured to communicate with a second layer providing mobile network communication between the nodes at a second bandwidth. In some embodiments, first node 148a may be configured to communicate with a third layer providing satellite communication between the nodes at a third bandwidth. In some embodiments, any node of network system 300 may be configured to communicate with any layer of communication. In some embodiments, a node of network system 300 may include an antenna configured to provide radio communication between one or more nodes. For example, and without limitation, an antenna may include a directional antenna. In an embodiment, network system 300 may include a first bandwidth, a second bandwidth, and a third bandwidth. In some embodiments, network system 300 may include more or less than three bandwidths. In some embodiments, a first bandwidth may be greater than a second bandwidth and a third bandwidth. In some embodiments, network system 300 may be configured to provide mobile network communication in the form a cellular network, such as, but not limited to, 2G, 3G, 4G, 5G, LTE, and/or other cellular network standards.

Still referring to FIG. 3, radio communication, in accordance with embodiments, may utilize at least a communication band and communication protocols suitable for aircraft radio communication. For example, and without limitation, a very-high-frequency (VHF) air band with frequencies between about 108 MHz and about 137 MHz may be utilized for radio communication. In another example, and without limitation, frequencies in the Gigahertz range may be utilized. Airband or aircraft band is the name for a group of frequencies in the VHF radio spectrum allocated to radio communication in civil aviation, sometimes also referred to as VHF, or phonetically as "Victor". Different sections of the band are used for radio-navigational aids and air traffic control. Radio communication protocols for aircraft are typically governed by the regulations of the Federal Aviation Authority (FAA) in the United States and by other regulatory authorities internationally. Radio communication protocols may employ, for example and without limitation an S band with frequencies in the range from about 2 GHz to about 4 GHz. For example, and without limitation, for 4G mobile network communication frequency bands in the range of about 2 GHz to about 8 GHz may be utilized, and for 5G mobile network communication frequency bands in the ranges of about 450 MHz to about 6 GHz and of about 24 GHz to about 53 GHz may be utilized. Mobile network communication may utilize, for example and without limitation, a mobile network protocol that allows users to move from one network to another with the same IP address. In some embodiments, a node of network system 300 may be configured to transmit and/or receive a radio frequency transmission signal. A "radio frequency transmission signal," as used in this disclosure, is an alternating electric current or voltage or of a magnetic, electric, or electromagnetic field or mechanical system in the frequency range from approximately 20 kHz to approximately 300 GHz. A radio frequency (RF) transmission signal may compose an analogue and/or digital signal received and be transmitted using functionality of output power of radio frequency from a transmitter to an antenna, and/or any RF receiver. A RF transmission signal may use longwave transmitter device for transmission of signals. An RF transmission signal may include a variety of frequency ranges, wavelength ranges, ITU designations, and IEEE bands including HF, VHF, UHF, L, S, C, X, Ku, K, Ka, V, W, mm, among others.

Still referring to FIG. 3, satellite communication, in accordance with embodiments, may utilize at least a communication band and communication protocols suitable for aircraft satellite communication. For example, and without limitation, satellite communication bands may include L-band (1-2 GHz), C-band (4-8 GHz), X-band (8-12 GHz), Ku-band (12-18 GHz), Ku-band (12-18 GHz), and the like, among others. Satellite communication protocols may employ, for example and without limitation, a Secondary Surveillance Radar (SSR) system, automated dependent surveillance-broadcast (ADS-B) system, or the like. In SSR, radar stations may use radar to interrogate transponders attached to or contained in aircraft and receive information in response describing such information as aircraft identity, codes describing flight plans, codes describing destination, and the like SSR may utilize any suitable interrogation mode, including Mode S interrogation for generalized information. ADS-B may implement two communication protocols, ADS-B-Out and ADS-B-In. ADS-B-Out may transmit aircraft position and ADS-B-In may receive aircraft position. Radio communication equipment may include any equipment suitable to carry on communication via electromagnetic waves at a particular bandwidth or bandwidth range, for example and without limitation, a receiver, a transmitter, a transceiver, an antenna, an aerial, and the like, among others. A mobile or cellular network communication equipment may include any equipment suitable to carry on communication via electromagnetic waves at a particular bandwidth or bandwidth range, for example and without limitation, a cellular phone, a smart phone, a personal digital assistant (PDA), a tablet, an antenna, an aerial, and the like, among others. A satellite communication equipment may include any equipment suitable to carry on communication via electromagnetic waves at a particular bandwidth or bandwidth range, for example and without limitation, a satellite data unit, an amplifier, an antenna, an aerial, and the like, among others.

Still referring to FIG. 3, as used in this disclosure "bandwidth" is measured as the amount of data that can be transferred from one point or location to another in a specific amount of time. The points or locations may be within a given network. Typically, bandwidth is expressed as a bitrate and measured in bits per second (bps). In some instances, bandwidth may also indicate a range within a band of wavelengths, frequencies, or energies, for example and without limitation, a range of radio frequencies which is utilized for a particular communication.

Still referring to FIG. 3, as used in this disclosure "antenna" is a rod, wire, aerial or other device used to transmit or receive signals such as, without limitation, radio signals and the like. A "directional antenna" or beam antenna is an antenna which radiates or receives greater power in specific directions allowing increased performance and reduced interference from unwanted sources. Typical examples of directional antennas include the Yagi antenna, the log-periodic antenna, and the corner reflector antenna. The directional antenna may include a high-gain antenna (HGA) which is a directional antenna with a focused, narrow radio wave beamwidth and a low-gain antenna (LGA) which is an omnidirectional antenna with a broad radio wave beamwidth, as needed or desired.

With continued reference to FIG. 3, as used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 3, in some cases, a node of network system 300 may perform one or more signal processing steps on a sensed characteristic. For instance, a node may analyze, modify, and/or synthesize a signal representative of characteristic in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Figure 4:
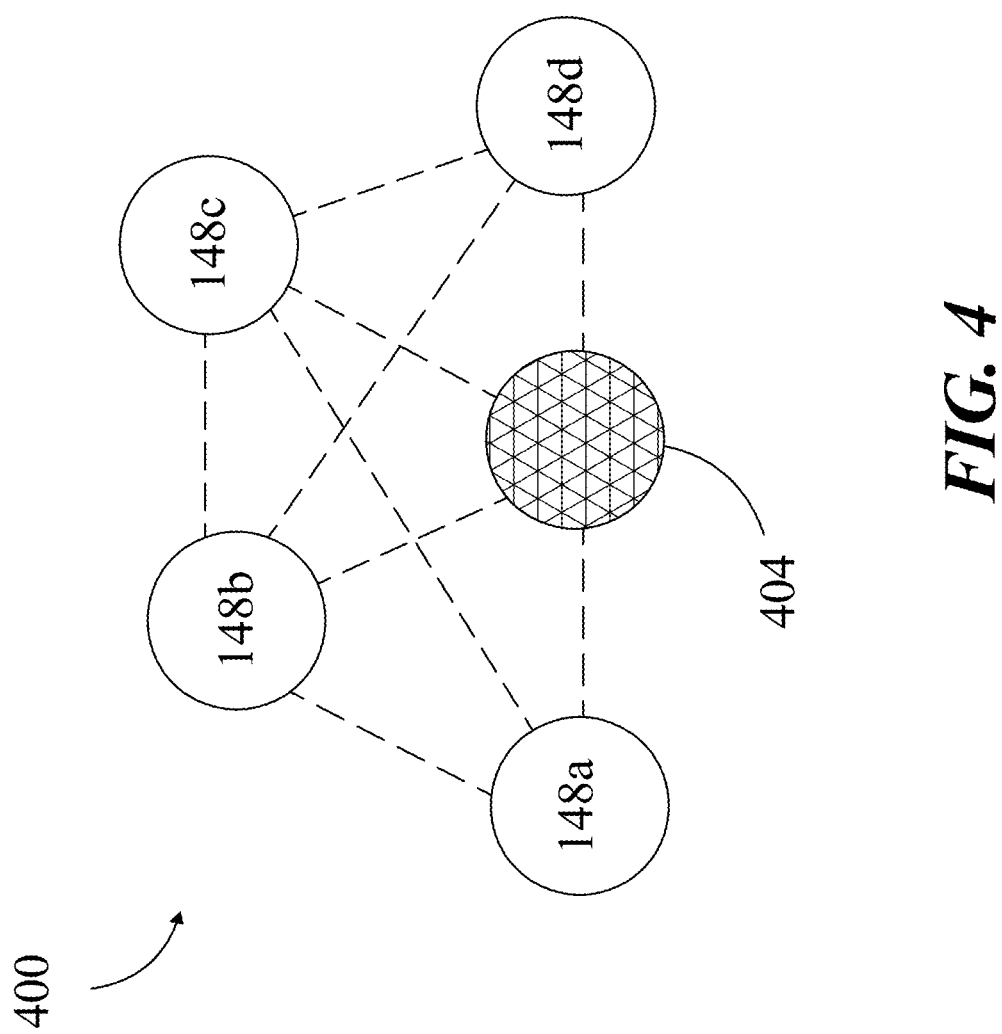
FIG. 4 is a block diagram illustrating the network system according to the embodiment in FIG. 3.

Now referring to FIG. 4, an exemplary embodiment of a network system 400 is illustrated. In some embodiments, network system 400 may include nodes 148a, 148b, 148c, and 148d. A network of nodes of network system 400 may be configured as described previously with respect to FIG. 3. Network system 400 shows inactive node 404. Inactive node 404 may include a physically damaged node generating component, data corrupted node, and/or powered down node. In a non-limiting example, first node 148a may be configured to transmit data to inactive node 404. Inactive node 404 may be configured to relay data from first node 148a to fourth node 148d. First node 148a may be configured to communicate with another node to relay data to fourth node 148d in the case that inactive node 404 may not be functioning. In some embodiments, first node 148a may be configured to relay data to second node 148b. Second node 148b may be configured to relay data from first node 148a to fourth node 148d. In some embodiments, first node 148a may be configured to transmit data to third node 148c. Third node 148c may be configured to relay data from first node 148a to fourth node 148d. Any node of network system 400 may be configured to relay data from one node to another through an alternate pathway in an event a node may be inactive. In some embodiments, nodes of network system 400 may be configured to choose a data transmission pathway from one node to another node. A "data transmission pathway" as used in this disclosure is a selection of communication from one node to one or more other nodes. In some embodiments, a data transmission pathway may be calculated based on, but not limited to, signal strength, node distance, number of nodes, node traffic, inactive nodes, active nodes, and the like. In a non-limiting example, first node 148*a* may transmit data to fourth node 148*d* through third node 148*c*. Third node 148*c* may have a slow response time communicating data to first node 148*a*. First node 148*a* may detect a slow response time of third node 148*c* and update a pathway of transmission by communicating data to second node 148*b* which may relay data to fourth node 148*d*. In some embodiments, network system 400 may utilize a machine learning model to predict optimal data transmission pathways of nodes. A machine learning model may input a plurality of node connections and output an optimal data transmission pathway between nodes. In some embodiments, a machine learning model may be trained on training data correlating node connections to an optimal data transmission pathway. Network system 400 may utilize a machine learning model to update connections between nodes that may assist in transmission speed, data security, and the like.

Still referring to FIG. 2, in some embodiments, network system 400 may include an encryption system. Network system 400 may use data encryption, for example the Advanced Encryption Standard, converting data from a first form, such as "plaintext", into a second form, such as "ciphertext", which may be unintelligible unless decrypted back to "plaintext". Encryption and/or decryption may require a corresponding key. A key may implement a public key cryptographic system. Network system 400 may use a hashing algorithm to produce a cryptographic hash, a secure proof protocol, a zero-knowledge proof, and/or any other encryption system known by one of ordinary skill in the field.

Network system may be consistent with disclosure of mesh network system in U.S. patent application Ser. No. 17/478,067 filed on Sep. 17, 2021 and titled "SYSTEM FOR A MESH NETWORK FOR USE IN AIRCRAFTS", which is incorporated by reference herein in its entirety.

Network system is configured to receive external metric and aircraft metric from sensor board of each of aerial vehicles and update a flight plan of aerial vehicles based on external metric and aircraft metric.

Figure 5:
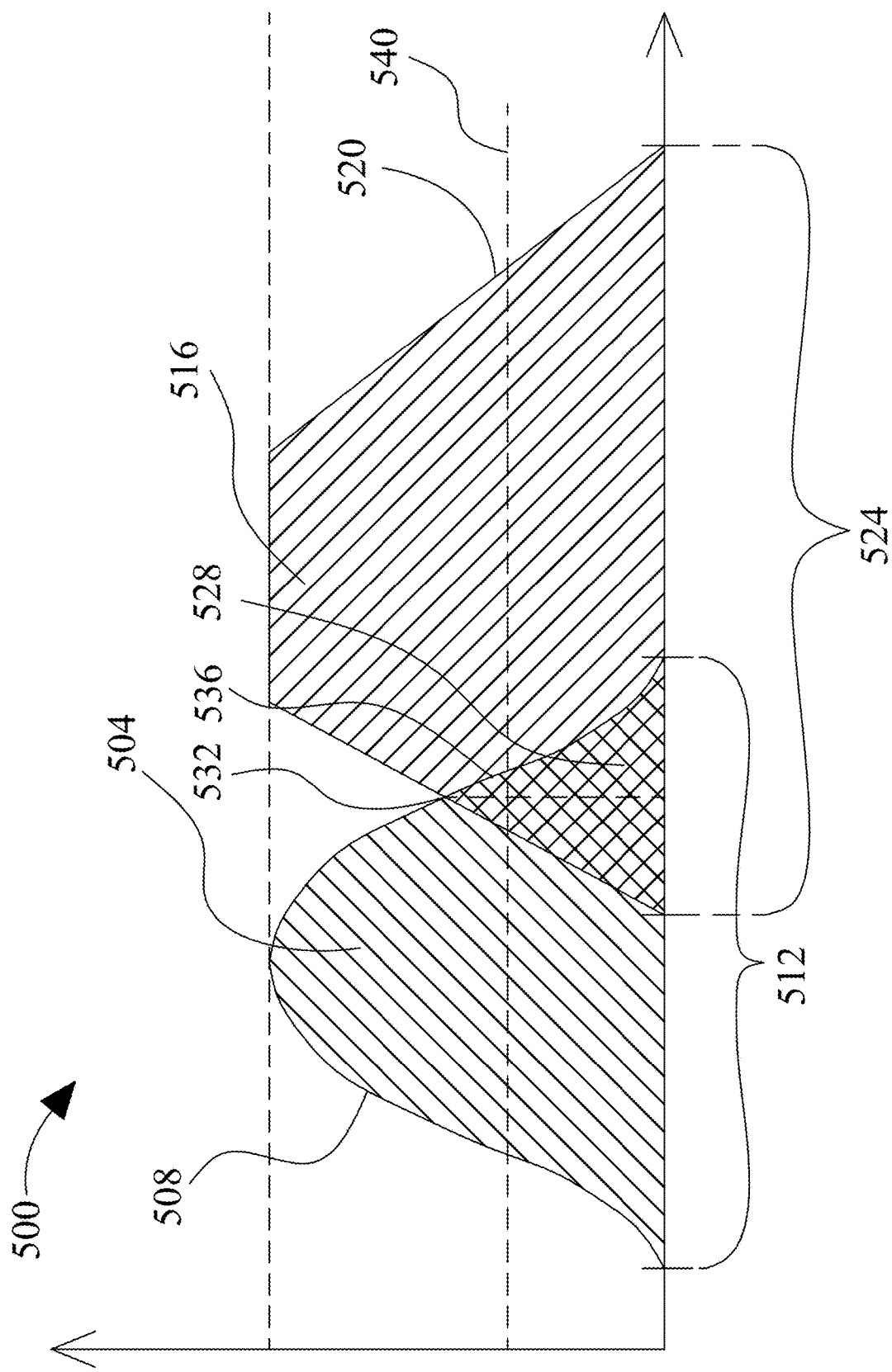
FIG. 5 is a graph illustrating properties of exemplary embodiments of fuzzy sets according to the present disclosure.

Referring now to FIG. 5, an exemplary embodiment of fuzzy set comparison 500 is illustrated. A first fuzzy set 504 may be represented, without limitation, according to a first membership function 508 representing a probability that an input falling on a first range of values 516 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure. A fuzzy set may include Cartesian products of two or more fuzzy sets as described above.

First fuzzy set 504 may represent any value or combination of values as described above, A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between fields and/or parameters represented by one or more fuzzy sets and/or Cartesian products thereof for combination to occur as described above. There may be multiple thresholds. Each threshold may be established by one or more user inputs. Alternatively or additionally, each threshold may be tuned by a machine-learning and/or statistical process, for instance and without limitation as described above.

Referring now to FIG. 6, in one or more embodiments, aerial vehicle may include a vertical takeoff and landing aircraft (eVTOL). As used herein, a vertical take-off and landing (eVTOL) aircraft is an electrically powered aircraft that can take off and land vertically. An eVTOL aircraft may be capable of hovering. In order, without limitation, to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight is where the aircraft generates lift and propulsion by way of one or more powered rotors coupled with an engine, such as a "quad copter," helicopter, or other vehicle that maintains its lift primarily using downward thrusting propulsors. Fixed-wing flight, as described herein, is where the aircraft is capable of flight using wings and/or foils that generate life caused by an aircraft's forward airspeed and the shape of the wings and/or foils, such as in airplane-style flight.

With continued reference to FIG. 6, a number of aerodynamic forces may act upon aerial vehicle during flight. Forces acting on aerial vehicle during flight may include, without limitation, thrust, a forward force produced by a propulsor of aerial vehicle, which may act parallel to a longitudinal axis 604 of aerial vehicle. Another force acting upon aerial vehicle may include, without limitation, drag, defined as a rearward retarding force which is caused by disruption of airflow by any protruding surface of aerial vehicle such as, without limitation, a wing, rotor, and/or fuselage. Drag may oppose thrust and act rearward parallel to relative wind. A further force acting upon aerial vehicle may include, without limitation, weight, which may include a combined load of aerial vehicle itself, crew, baggage, and/or fuel. Weight may pull aerial vehicle downward due to the force of gravity. An additional force acting on aerial vehicle may include, without limitation, lift, which may act to oppose the downward force of weight and may be produced by a dynamic effect of air acting on an airfoil and/or downward thrust from a propulsor of aerial vehicle. Lift generated by an airfoil may depend on speed of airflow, density of air, total area of the airfoil and/or a segment thereof, and/or an angle of attack between air and the airfoil. In a non-limiting example, aerial vehicle may be designed to be as lightweight as possible.

Referring still to FIG. 6, aerial vehicle may include at least a vertical propulsor 608 and at least a forward propulsor 612. At least a forward propulsor 612 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel aerial vehicles 104 forward or backward on the ground. At least a vertical propulsor 608 and at least a forward propulsor 612 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically connected to the at least a first propulsor as a source of thrust.

With continued reference to FIG. 6, the generated optimal flight trajectory may result in aircraft command 128 being transmitted from computing device 124 to flight components of aerial vehicles 104. Aircraft command 128 may include a desired function of flight components to maintain trajectory of an aircraft despite wind forces acting on the aircraft. As previously mentioned, "flight components", for the purposes of this disclosure, include components related to and mechanically connected to an aircraft that manipulates a fluid medium in order to propel and maneuver the aircraft through the fluid medium. An aircraft's "trajectory", for the purposes of this disclosure, is the flight path that an object with mass in motion follows through space as a function of time.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments describe herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
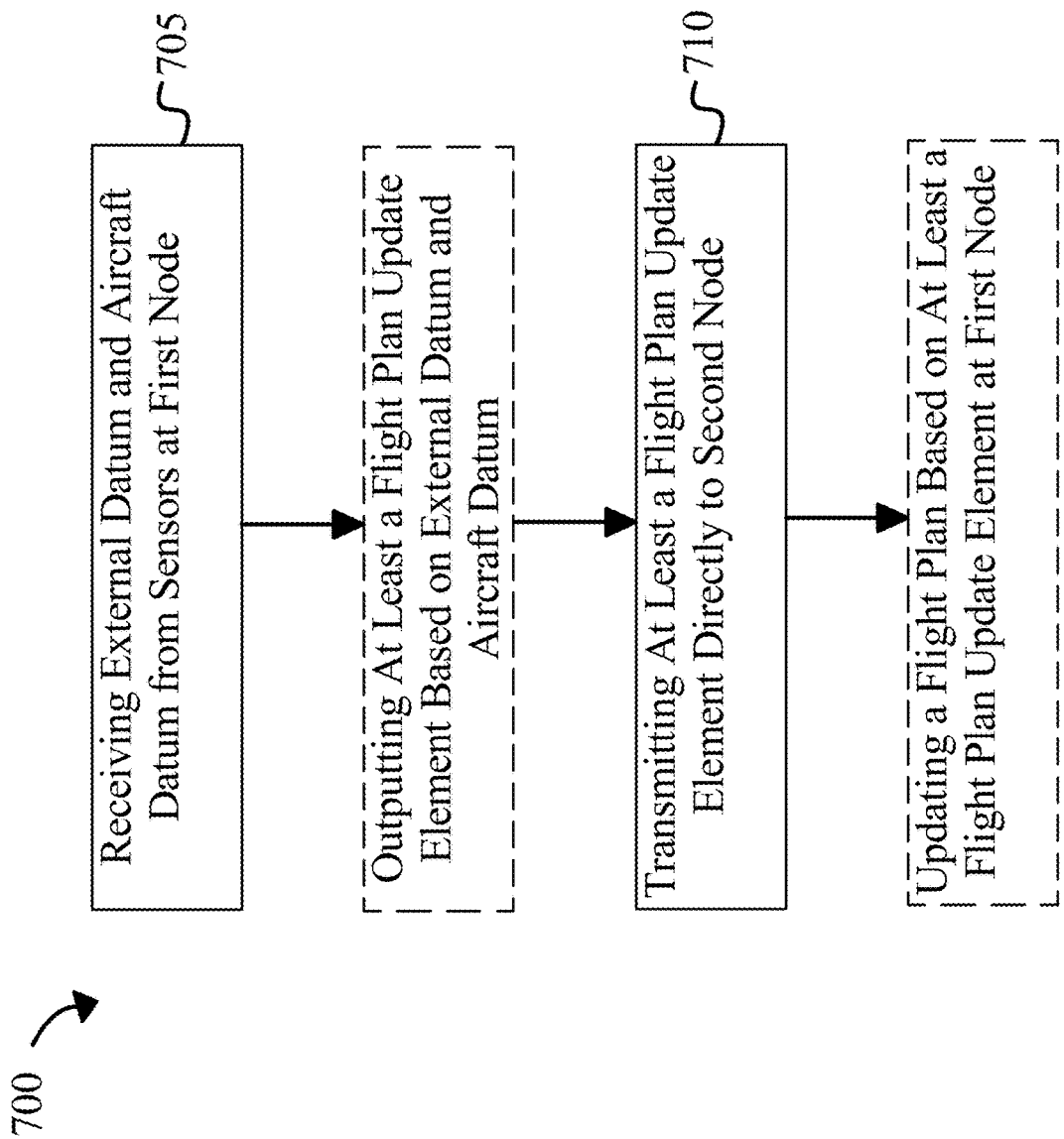
FIG. 7 is a block diagram illustrating a method for automated fleet management for aerial vehicles according to an embodiment of the present invention.

Referring now to FIG. 7, an exemplary embodiment of a method 700 for implementing a system of automated fleet management for a plurality of aerial vehicles is illustrated. At step 705, computing device operating on a first aerial vehicle and communicatively connected to a network including at least a second aerial vehicle receives an external datum based on an external metric from a first sensor and an aircraft datum based on an aircraft metric from a second sensor; this may be implemented, without limitation, as described above in reference to FIGS. 1-7. First aerial vehicle may include a first node, and second aerial vehicle may include a second node. At an optional step, computing device at first node may output at least a flight plan update element based on external datum and/or aircraft datum. First node may transmit external datum and aircraft datum to a second node in second aerial vehicle. Aircraft metric may include a torque output. Aircraft metric may include a battery temperature. Aircraft metric may include a wind velocity. Network may include a mesh network. Mesh network may be configured to control plurality of aerial vehicles as a single aerial vehicle. Network may be configured for first aerial vehicle to communicate data directly to second aerial vehicle. First aerial vehicle may include an eVTOL aircraft.

At step 710, computing device transmits at least a flight plan update element based on external datum and aircraft datum; this may be implemented, without limitation, as described above in reference to FIGS. 1-7. First node of network may update flight plan of first aerial vehicle based on external datum and aircraft datum. In an optional step, second node of network may update flight plan of second aerial vehicle based on external datum and aircraft datum. At least a flight plan update element may be automated. At least a flight plan update element may comprise altering a position of a first aerial vehicle of plurality of aerial vehicles relative to position of a second aerial vehicle of plurality of aerial vehicles.

Figure 8:
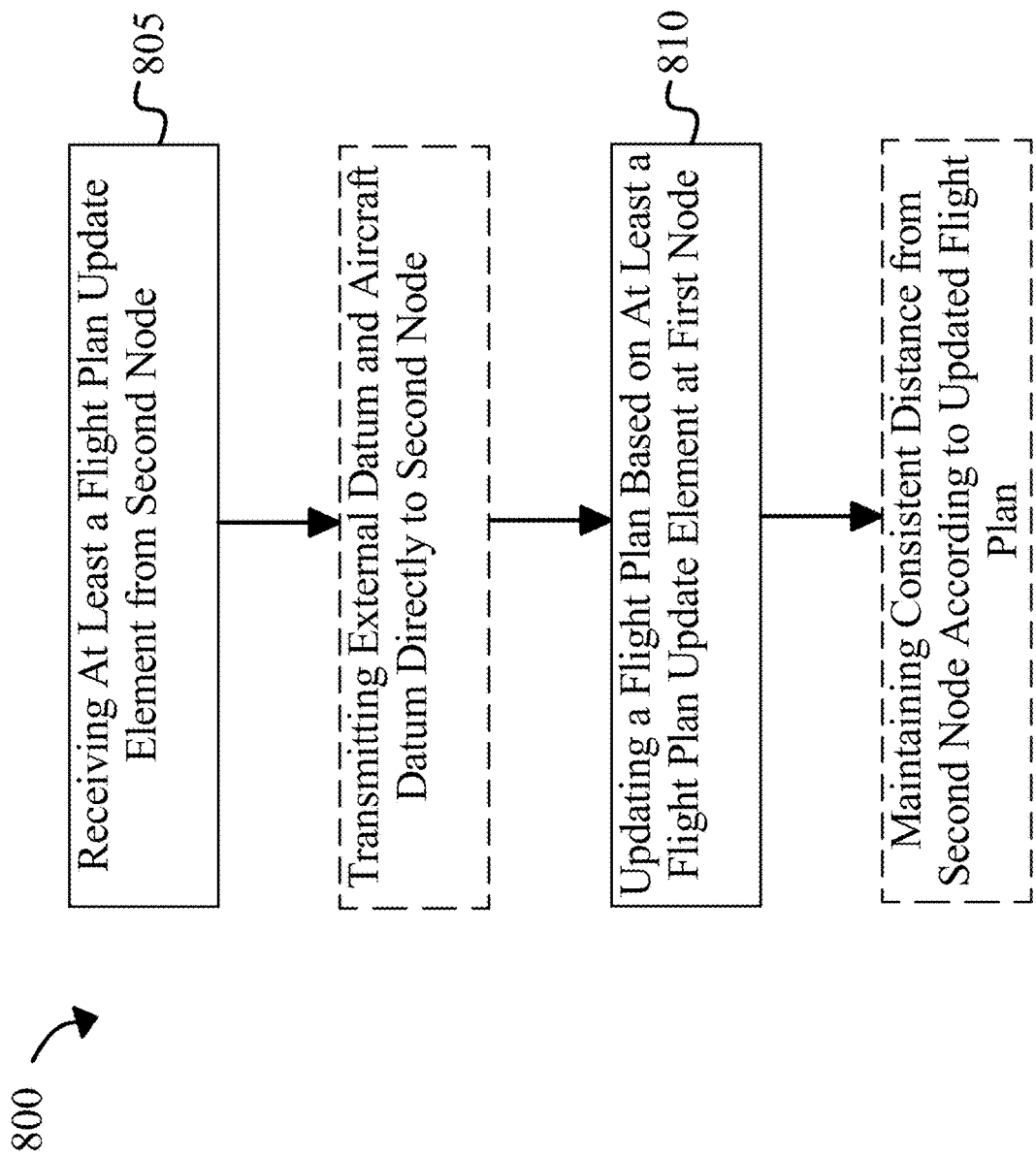
FIG. 8 is a block diagram illustrating a method for automated fleet management for aerial vehicles according to an embodiment of the present invention.

Referring now to FIG. 8, an exemplary embodiment of a method 800 for implementing a system of automated fleet management for a plurality of aerial vehicles is illustrated. At step 805, computing device, operating on a first aerial vehicle and communicatively connected to a network including at least a second aerial vehicle, receives at least a flight plan update element from the second aerial vehicle. First aerial vehicle may include a first node, and second aerial vehicle may include a second node. Flight plan update element may be based on external datum from a first sensor on the second aerial vehicle and aircraft datum from a second sensor on the second aerial vehicle. At step 810, computing device updates a flight plan for the first aerial vehicle based on the at least a flight plan update element. The updated flight plan may cause first aerial vehicle and second aerial vehicle to maintain a consistent distant apart.

Figure 9:
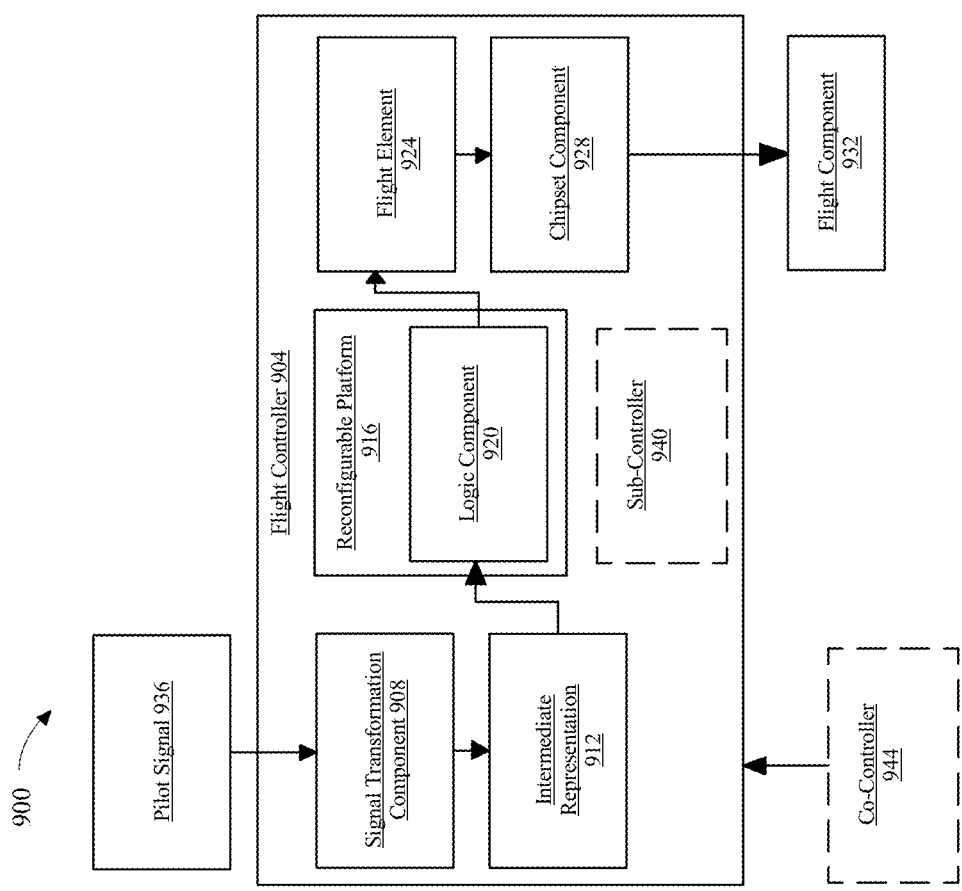
FIG. 9 is a block diagram of a flight controller according to an embodiment of the present disclosure.

Now referring to FIG. 9, an exemplary embodiment 900 of a flight controller 904 is illustrated. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or system on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In embodiments, flight controller 904 may be installed in an aircraft, may control the aircraft remotely, and/or may include an element installed in the aircraft and a remote element in communication therewith.

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

In an embodiment, and without limitation, signal transformation component 908 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 920 may include one or more integrated circuit microprocessors, which may contain one or more central processing units, central processors, and/or main processors, on a single metal-oxide-semiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

In an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

Still referring to FIG. 9, flight controller 904 may include a chipset component 928. As used in this disclosure a "chipset component" is a component that manages data flow. In an embodiment, and without limitation, chipset component 928 may include a northbridge data flow path, wherein the northbridge dataflow path may manage data flow from logic component 920 to a high-speed device and/or component, such as a RAM, graphics controller, and the like thereof. In another embodiment, and without limitation, chipset component 928 may include a southbridge data flow path, wherein the southbridge dataflow path may manage data flow from logic component 920 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 928 may manage data flow between logic component 920, memory cache, and a flight component 932. As used in this disclosure a "flight component" is a portion of an aircraft that can be moved or adjusted to affect one or more flight elements. For example, flight component 932 may include a component used to affect the aircrafts' roll and pitch which may comprise one or more ailerons. As a further example, flight component 932 may include a rudder to control yaw of an aircraft. In an embodiment, chipset component 928 may be configured to communicate with a plurality of flight components as a function of flight element 924. For example, and without limitation, chipset component 928 may transmit to an aircraft rotor to reduce torque of a first lift propulsor and increase the forward thrust produced by a pusher component to perform a flight maneuver.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 9, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 932. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 9, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 904. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 912 and/or output language from logic component 920, wherein output language may include one or more analog-to-digital conversions, low bit rate transmissions, message encryptions, digital signals, binary signals, logic signals, analog signals, and the like thereof described above in detail.

Still referring to FIG. 9, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 9, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 9, flight controller 904 may also be implemented using a "shared nothing" architecture in which data is cached at the worker, in an embodiment, this may enable scalability of aircraft and/or computing device. Flight controller 904 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control system. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 10:
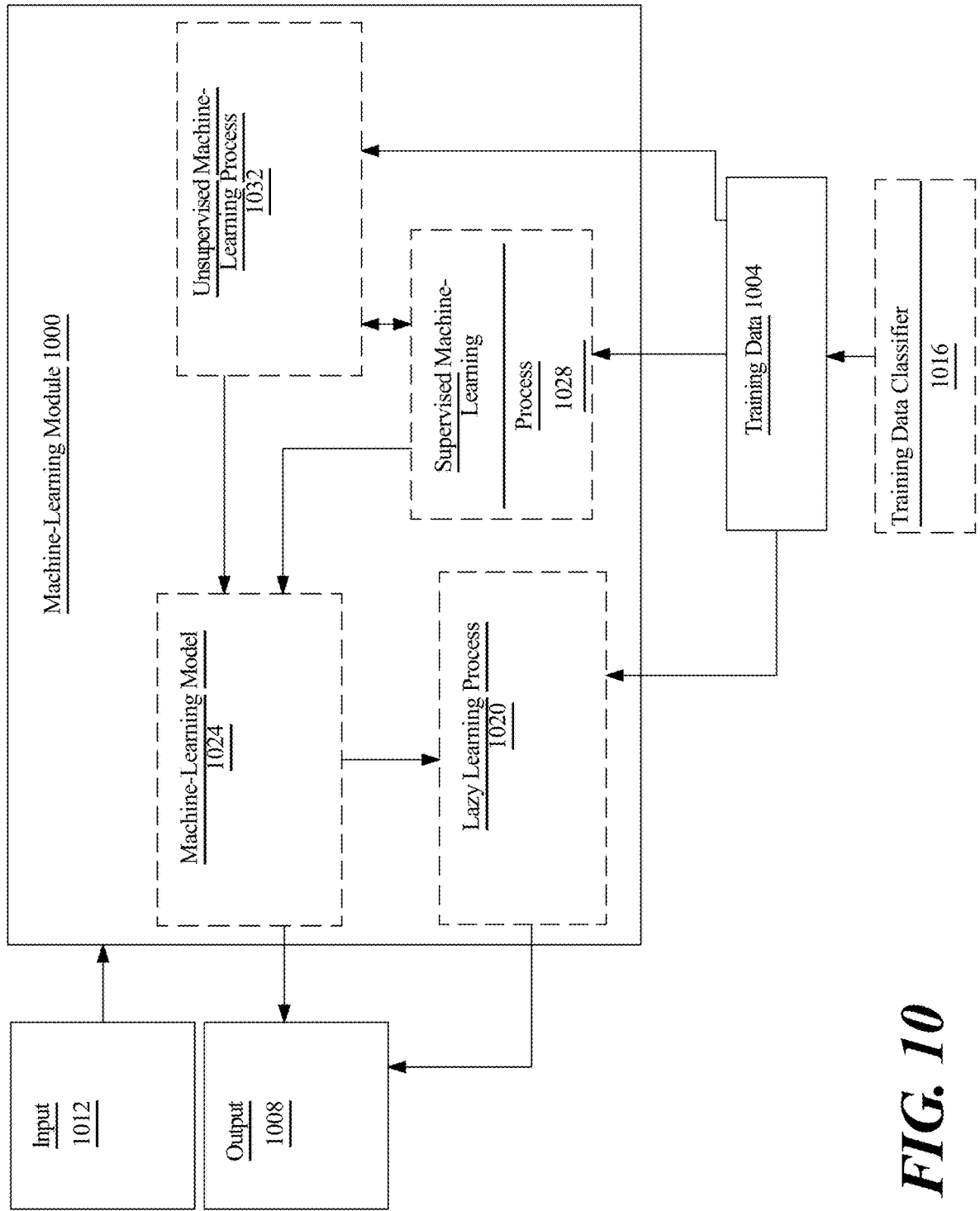
FIG. 10 is a block diagram of a machine-learning module according to an embodiment of the present disclosure.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example flight elements and/or pilot signals may be inputs, wherein an output may be an autonomous function.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
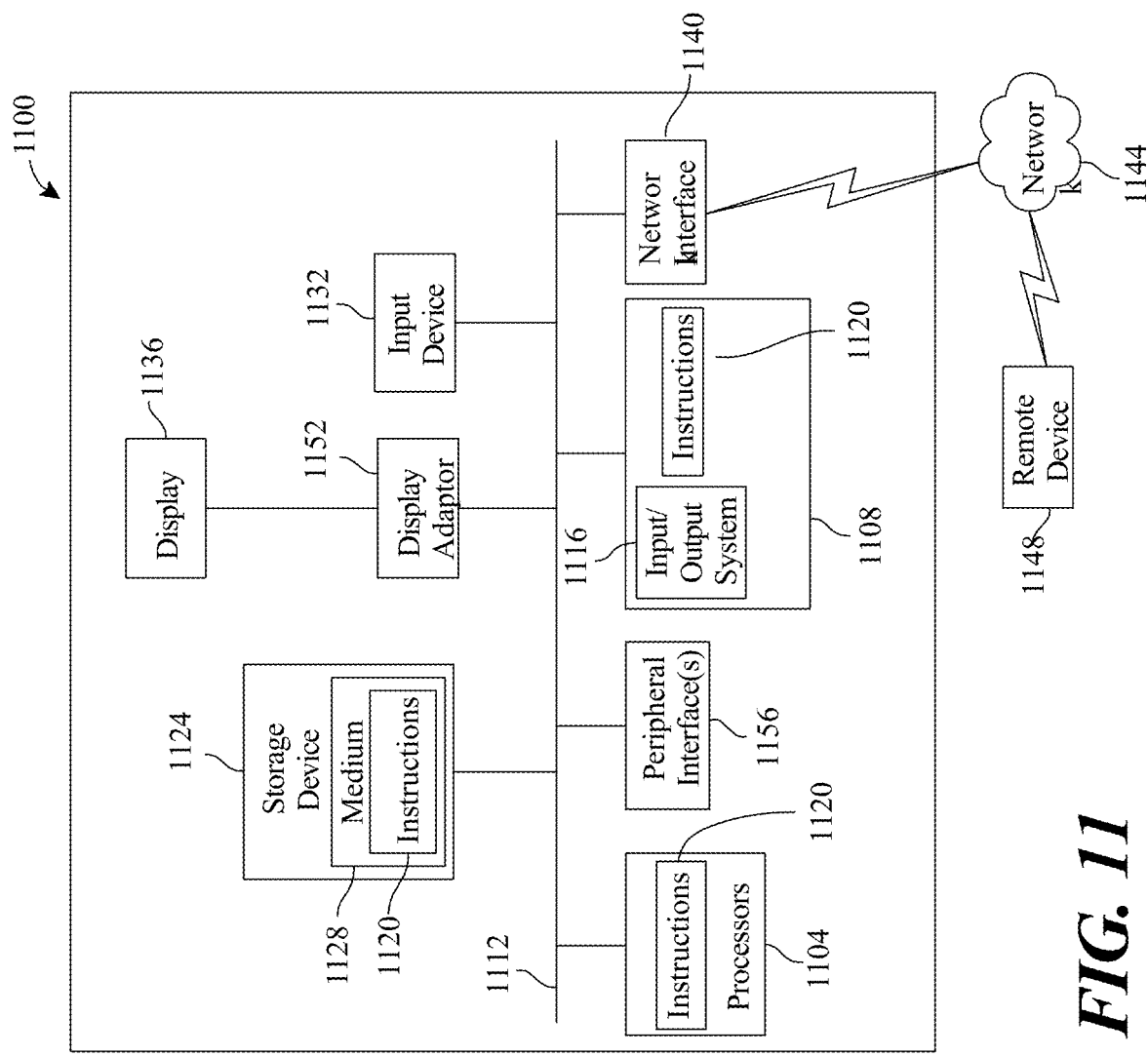
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system of automated fleet management for aerial vehicles, comprising:
   a first aerial vehicle, the first aerial vehicle comprising:
      a first sensor configured to measure an external metric and generate an external datum based on the external metric, wherein the external metric comprises a visibility measurement around the first aerial vehicle; and
      a second sensor configured to measure an aircraft metric and generate an aircraft datum based on the aircraft metric;
   a first computing device operating onboard the first aerial vehicle and including a first node, the first computing device communicatively connected to a layered data network including at least a second aerial vehicle, the first computing device configured to:
      receive the external datum from the first sensor of the first aerial vehicle and the aircraft datum from the second sensor of the first aerial vehicle;
      modify a flight trajectory of the first aerial vehicle, wherein modifying the flight trajectory comprises:
         generating a flight trajectory datum, using a plant model, as a function of the external datum and the aircraft datum; and
         generating at least an aircraft command as a function of the flight trajectory datum; and
      transmit at least a flight plan update element, based on the flight trajectory datum, from the first node via the layered data network to the at least a second aerial vehicle, wherein the layered data network comprises independent data layers that provide redundancy in communications; and
   a second computing device onboard the at least a second aerial vehicle and including a second node, the second computing device configured to:
      receive, at the second node, the at least a flight plan update element from the first aerial vehicle; and
      update a flight plan for the second aerial vehicle based on the at least a flight plan update element received from the first aerial vehicle, wherein the first and second nodes are configured to update corresponding flight paths of each of the first and second aerial vehicles so as to maintain consistent displacements therebetween.

2. The system of claim 1, wherein the aircraft metric comprises a torque output.

3. The system of claim 1, wherein the aircraft metric comprises a battery temperature.

4. The system of claim 1, wherein the external metric comprises a wind velocity.

5. The system of claim 1, wherein the layered data network comprises a mesh network.

6. The system of claim 5, wherein the mesh network is configured to control the first aerial vehicle and the at least a second aerial vehicle as a single aerial vehicle.

7. The system of claim 1, wherein the layered data network is configured for the first aerial vehicle to communicate data directly to the at least a second aerial vehicle.

8. The system of claim 1, wherein the first aerial vehicle comprises an electrical vertical takeoff and landing (eVTOL) aircraft.

9. The system of claim 1, wherein the at least a flight plan update element comprises altering a position of the first aerial vehicle relative to a position of the at least a second aerial vehicle.

10. The system of claim 1, wherein the first computing device is further configured to generate an aircraft command as a function of the external datum and the aircraft datum.

11. A method for implementing a system of automated fleet management for aerial vehicles, comprising:
   receiving, at a first computing device, including a first node, operating onboard a first aerial vehicle and communicatively connected to a layered data network including at least a second aerial vehicle, an external datum based on an external metric from a first sensor and an aircraft datum based on an aircraft metric from a second sensor, wherein the external metric comprises a visibility measurement around the first aerial vehicle;
   modifying, by the first computing device, a flight trajectory of the first aerial vehicle, wherein modifying the flight trajectory comprises:
      generating a flight trajectory datum, using a plant model, as a function of the external datum and the aircraft datum; and
      generating at least an aircraft command as a function of the flight trajectory datum;
   transmitting, by the first computing device, at least a flight plan update element, based on the flight trajectory datum, from the first node, via the layered data network, to the at least a second aerial vehicle, wherein the layered data network comprises independent data layers that provide redundancy in communications;
   receiving, at a second node of a second computing device onboard the at least a second aerial vehicle, the at least a flight plan update element from the first aerial vehicle;
   updating, by the second computing device, a flight plan for the second aerial vehicle based on the at least a flight plan update element received from the first aerial vehicle; and
   updating, at the first and second nodes, corresponding flight paths of each of the first and second aerial vehicles so as to maintain consistent displacements therebetween.

12. The method of claim 11, wherein the aircraft metric comprises a torque output.

13. The method of claim 11, wherein the aircraft metric comprises a battery temperature.

14. The method of claim 11, wherein the external metric comprises a wind velocity.

15. The method of claim 11, wherein the layered data network comprises a mesh network.

16. The method of claim 15, wherein the mesh network is configured to control the first aerial vehicle and the at least a second aerial vehicle as a single aerial vehicle.

17. The method of claim 11, wherein the layered data network is configured for the first aerial vehicle to communicate data directly to the at least a second aerial vehicle.

18. The method of claim 11, wherein the first aerial vehicle comprises an electrical vertical takeoff and landing (eVTOL) aircraft.

19. The method of claim 11, wherein the at least a flight plan update element comprises altering a position of the first aerial vehicle relative to a position of the at least a second aerial vehicle.

20. The method of claim 11, further comprising generating, at the first computing device, an aircraft command as a function of the external datum and the aircraft datum.

* * * * *